US012714637B2

(12) United States Patent
Wu et al.

(10) Patent No.: US 12,714,637 B2
(45) Date of Patent: Aug. 25, 2026

(54) SEXUAL STIMULATION DEVICE

(71) Applicants: Dongguan Yueya Technology Co., Ltd., Dongguan (CN); Dongguan Hongxiang Electronic Technology Co., Ltd., Dongguan (CN); Shenzhen Zhonghongtian Technology Co., Ltd., Shenzhen (CN)

(72) Inventors: Dongjun Wu, Dongguan (CN); Qinduo Wang, Heyuan (CN)

(73) Assignees: Dongguan Yueya Technology Co., Ltd., Dongguan (CN); Dongguan Hongxiang Electronic Technology Co., Ltd., Dongguan (CN); Shenzhen Zhonghongtian Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/014,259

(22) Filed: Jan. 9, 2025

(65) Prior Publication Data

US 2025/0143960 A1 May 8, 2025

Related U.S. Application Data

(63) Continuation-in-part of application No. 18/642,854, filed on Apr. 23, 2024, now Pat. No. 12,213,931.

(51) Int. Cl.
*A61H 19/00* (2006.01)
*A61H 7/00* (2006.01)
*A61H 23/02* (2006.01)

(52) U.S. Cl.
CPC ............ *A61H 19/44* (2013.01); *A61H 7/005* (2013.01); *A61H 19/34* (2013.01);
(Continued)

(58) Field of Classification Search
CPC ........ A61H 19/00; A61H 19/30; A61H 19/34; A61H 19/40; A61H 19/44; A61H 19/50;
(Continued)

(56) References Cited

U.S. PATENT DOCUMENTS 3,874,373 A * 4/1975 Sobel .................... A61H 19/34 601/112
5,470,303 A * 11/1995 Leonard ................ A61H 19/34 600/38
(Continued)

FOREIGN PATENT DOCUMENTS

CN 2239799 Y * 11/1996 ............ A61H 19/34
CN 104367458 A * 2/2015 ......... A61H 23/0254
(Continued)

OTHER PUBLICATIONS

Notice of Refusal Dated Feb. 18, 2025 for corresponding Japan Patent Application No. 2025-011404.
(Continued)

*Primary Examiner* — Tu A Vo

(57) ABSTRACT

A sexual stimulation device includes a shell and a driving mechanism. The shell includes a massage portion and a massage end, and each of the massage portion and the massage end comprising flexible material. The driving mechanism is provided in the shell. The driving mechanism is connected to the massage portion in a transmission way to drive the massage portion to rotate. The driving mechanism is further connected to the massage end in a transmission way to drive the massage end to rotate, swing, or move back and forth.

10 Claims, 33 Drawing Sheets

(52) U.S. Cl.
CPC . *A61H 23/0254* (2013.01); *A61H 2201/0153* (2013.01); *A61H 2201/5025* (2013.01)

(58) Field of Classification Search
CPC ........ A61H 7/004–005; A61H 23/0254; A61H 21/00; A61H 7/007
See application file for complete search history.

(56) References Cited

U.S. PATENT DOCUMENTS

| | | | | |
|---|---|---|---|---|
| 6,190,307 | B1 * | 2/2001 | Tsai | A61H 19/34<br>601/51 |
| 7,988,650 | B2 * | 8/2011 | Nan | A61H 23/0254<br>601/87 |
| 11,369,545 | B1 * | 6/2022 | He | A61H 7/005 |
| 11,491,078 | B1 * | 11/2022 | He | A61H 7/005 |
| 11,771,619 | B1 * | 10/2023 | Yan | A61H 19/44<br>600/38 |
| 11,806,306 | B1 * | 11/2023 | Guo | A61H 7/007 |
| 11,826,300 | B1 * | 11/2023 | Zhou | A61H 19/34 |
| 12,011,409 | B1 * | 6/2024 | Wang | A61H 19/40 |
| 12,064,386 | B1 * | 8/2024 | Yan | A61H 23/02 |
| 12,161,598 | B1 * | 12/2024 | Wang | A61H 23/0263 |
| 12,178,775 | B1 * | 12/2024 | Wang | A61H 19/34 |
| 12,201,572 | B2 * | 1/2025 | Yan | A61H 23/0254 |
| 12,208,053 | B1 * | 1/2025 | Liu | A61H 23/006 |
| 12,280,004 | B1 * | 4/2025 | Zhao | A61H 23/0254 |
| 12,303,451 | B1 * | 5/2025 | Liu | A61H 23/04 |
| 2008/0139980 | A1 * | 6/2008 | Fladl | A61H 19/32<br>601/70 |
| 2009/0198158 | A1 * | 8/2009 | Nan | A61H 23/0254<br>601/87 |
| 2010/0121234 | A1 * | 5/2010 | Nan | A61H 19/44<br>601/134 |
| 2015/0148592 | A1 * | 5/2015 | Kanbar | A61H 19/34<br>600/38 |
| 2016/0120737 | A1 * | 5/2016 | Sedic | A61H 23/0263<br>601/46 |
| 2018/0185237 | A1 * | 7/2018 | Baetica | G08C 17/02 |
| 2022/0257458 | A1 * | 8/2022 | Dickinson | A61H 19/44 |
| 2023/0346634 | A1 * | 11/2023 | Wu | A61H 23/004 |
| 2023/0355463 | A1 * | 11/2023 | Cirillo-Schmidt | A61H 21/00 |
| 2024/0016696 | A1 * | 1/2024 | Dumler | A61H 19/44 |
| 2024/0099933 | A1 * | 3/2024 | Lin | A61H 7/005 |
| 2024/0108538 | A1 * | 4/2024 | Chen | A61H 23/0254 |
| 2024/0277562 | A1 * | 8/2024 | Wang | A61H 7/00 |
| 2024/0307261 | A1 * | 9/2024 | Wang | A61H 23/006 |
| 2024/0325240 | A1 * | 10/2024 | Zhang | A61H 23/0254 |
| 2025/0041151 | A1 * | 2/2025 | Cai | A61H 19/30 |
| 2025/0161148 | A1 * | 5/2025 | Wang | A61H 19/30 |
| 2025/0161152 | A1 * | 5/2025 | Wang | A61H 19/30 |
| 2025/0248888 | A1 * | 8/2025 | Wang | A61H 19/44 |

FOREIGN PATENT DOCUMENTS

| | | | | | |
|---|---|---|---|---|---|
| CN | 206597142 | U | * | 10/2017 | |
| CN | 108743300 | A | * | 11/2018 | A61H 19/44 |
| CN | 109549832 | A | | 4/2019 | |
| CN | 209172880 | U | * | 7/2019 | |
| CN | 118986713 | A | * | 11/2024 | A61H 23/006 |
| FR | 2793138 | A3 | * | 11/2000 | A61H 19/44 |
| GB | 2492535 | A | * | 1/2013 | A61H 21/00 |
| JP | 2007296299 | A | | 11/2007 | |

OTHER PUBLICATIONS

Notice of Refusal Dated Jun. 17, 2025 for corresponding Japan Patent Application No. 2025-011404.

* cited by examiner

SEXUAL STIMULATION DEVICE

CROSS-REFERENCE TO RELATED APPLICATIONS

The present application is a Continuation in part Application of U.S. patent application Ser. No. 18/642,854, filed on Apr. 23, 2024, which claims the priorities of Chinese Patent Application No. 202420202016.X, filed on Jan. 26, 2024, and Chinese Patent Application No. 202420687877.1, filed on Apr. 3, 2024, the entire contents of which are hereby incorporated by reference.

TECHNICAL FIELD

The present disclosure relates to the technical field of sex toys, and in particular to a sexual stimulation device.

BACKGROUND

With the improvement of the human living, in addition to material aspects, more spiritual needs are being pursued. Sexual life has gained more and more attention as a spice of human life, and varied sex toys are developed to add pleasures to sexual life, which satisfy human physiological and psychological needs to a certain extent.

Generally, a sex toy includes a massage head and a motor driving the massage head to do linear reciprocating motion, thereby providing stimulation to a sensitive area of the human body, such as the clitoris, the vagina and the like that contact with the massage head. However, such sex toy stimulates the human body by a hitting of the massage head with a high-frequency, and unsatisfactory stimulation effect.

SUMMARY

An object of this application is to provide a sexual stimulation device, which has an enlarged stimulation range and better stimulation effect.

To achieve the above object, a sexual stimulation device is provided and includes:

- a shell comprising a massage portion and a massage end, each of the massage portion and the massage end comprising flexible material; and
- a driving mechanism provided in the shell, wherein the driving mechanism is connected to the massage portion in a transmission way to drive the massage portion to rotate, and the driving mechanism is further connected to the massage end in a transmission way to drive the massage end to rotate, swing, or move back and forth.

Compared with the prior art, the present application has the following beneficial effects: the massage portion rotates to form an annular trajectory, and thus kneads the sensitive area of the human body. The massage end moves to act on another part of the human body. Moreover, the massage portion and the massage end knead the human body, which is similar to the motion of the human hand, providing a more comfortable user experience. During use of the sexual stimulation device, the massage portion and the massage end simultaneously act on two different parts of the human body, further improving the stimulation effect.

BRIEF DESCRIPTION OF DRAWINGS

In order to illustrate the technical solution in embodiments of the present application more clearly, the following briefly introduces accompanying drawings used in the description of the embodiments. Obviously, the accompanying drawings in the following description are only some embodiments of the present application. Those of ordinary skill in the art can obtain other accompanying drawings from these accompanying drawings without any creative efforts.

DESCRIPTION OF EMBODIMENTS

Figure 1:
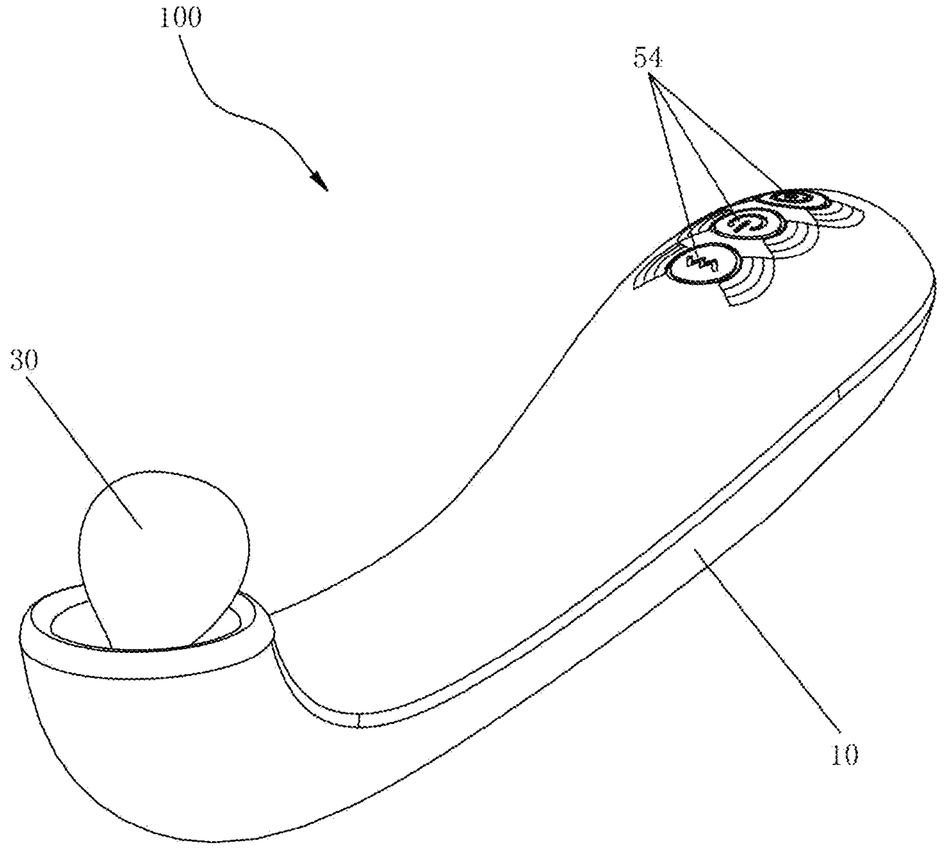
FIG. 1 is a schematic, assembled view of a sexual stimulation device according to a first embodiment of the present application.

In order to make those skilled in the art better understand the technical solution of the present application, the technical solution in the embodiments of the present application will be clearly and completely described below with reference to accompanying drawings in the embodiments of the present application. Obviously, the described embodiments are only a part of the embodiments of the present application, but not all of the embodiments. Based on the embodiments of the present application, all other embodiments obtained by those skilled in the art without any creative efforts fall within the protection scope of the present application.

It should be noted that when an element is said to be "connected" to another element, it may be directly connected to another element, or indirectly connected to another element through one or multiple intermediate elements.

In the specification, the oriental or positional relationships indicated by the terms "longitudinal", "transverse", "top", "bottom", "inner", "outer", "central", "axial", "radial", "circumferential" and the like are only intended to facilitate the description of the present application and simplify the description based on oriental or positional relationships shown in the accompanying drawings, not to indicate or imply that the apparatus or element referred must have a specific orientation, is constructed and operated in a specific orientation, and therefore cannot be understood as a limitation of the present application.

Unless otherwise specified and limited, the specific meanings of all technical and scientific terms used in the specification can be specifically understood by persons of ordinary skill in the art. The terms used in the specification of this application is for the purpose of describing specific embodiments only and is not intended to limit this application.

Referring to FIGS. 1-5, a sexual stimulation device 100 according to a first embodiment of the present application is shown. The sexual stimulation device 100 includes a shell 10 and a driving mechanism 20 arranged in the shell 10. The shell 10 is provided with a massage portion 11, and the driving mechanism 20 is connected to the massage portion 11 in a transmission way. Under the action of the driving mechanism 20, the massage portion 11 rotates around a first axis X1 to form an annular trajectory. A sensitive area of the human body, such as the clitoris, the vagina of the woman, the rectum, the prostate of the man, as long as it is covered by the annular trajectory of the massage portion 11, can be stimulated by the massage portion 11.

The massage portion 11, serving as a functional part of the present sexual stimulation device that directly acts on the human body, is flexible and may be made of silicone, rubber, and etc. The massage portion 11 has a soft touch and can provide a certain buffering effect, thereby improving the comfort of use. It should be noted that the massage portion 11 may be made of other soft materials that can directly contact the human body, which is not limited by the present application. Compared to the existing sexual stimulation devices which stimulate the human body by hitting in high-frequency, the massage portion 11 of the present sexual stimulation device rotates to form an annular trajectory, and thus kneads the sensitive area of the human body. An area of the human body kneaded by the massage portion 11 is enlarged and accordingly a stimulation effect is better. Moreover, the massage portion 11 kneads the human body, which is similar to the motion of the human hand, providing a more comfortable user experience.

In this embodiment, the shell 10 further includes a holding end. The massage portion 11 is defined on a front end of the shell 10, and the holding end is defined on a rear end of the shell 10 thus facilitating to grab the shell 10. In this embodiment, the massage portion 11 is generally spherical-shaped or ellipsoidal-shaped.

Figure 2:
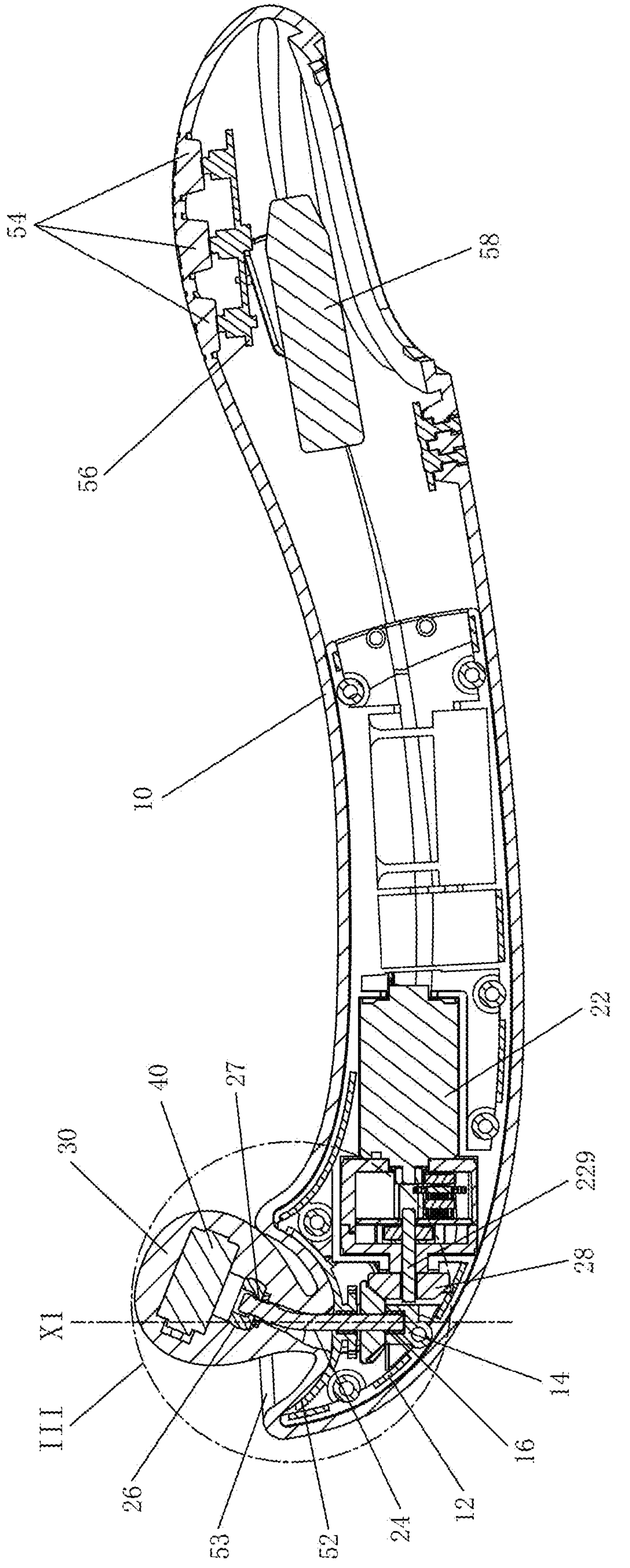
FIG. 2 is a cross sectional view of the sexual stimulation device of FIG. 1.

As shown in FIGS. 1-2, the shell 10 is elongated and generally rod-shaped, being similar to the male penis. During use, the shell 10, particularly the massage portion 11 of the shell 10, is inserted into the sexual organs of the human body, such as the vagina, the rectum and the like. It should be understood that the sexual stimulation device 100 of this application is not limited to be used in the human body. In some embodiments, the sexual stimulation device 100 may be used to stimulate the chest of the human body. According to specific application scenarios, the shell 10 may be configured with different shapes, making the massage portion 11 thereof be easily to contact the sexual organs of the user.

In this embodiment, a front end of the shell 10 is bent laterally, and a base portion 52 is formed on the front end of the shell 10. One end of the massage portion 11 serving as a connecting end is connected to the base portion 52, and another end of the massage portion 11 serving as a free end. Specifically, the base portion 52 is concaved inwardly recessed to form a bowl-shaped portion which is arranged around the first axis X1, wherein the first axis X1 is generally perpendicular to a longitudinal direction of the shell 10. The massage portion 11 is set in the base portion 52, with one end thereof serving as a connecting end for connecting a central, bottom of the base portion 52. The massage portion 11 extends partly beyond the base portion 52 through an open side 521 of the base portion 52. When the massage portion 11 is driven to rotate, it swings in the base portion 52 with its connecting end as the center. It should be understood that the base portion 52 may be other shape, such as a protrusion and a column being as high as the holding end.

In this embodiment, the shell 10 may be a double-layer structure, and includes an outer layer **10*a* and an inner layer 10*b* inside the outer layer 10*a*. The outer layer 10*a* is made of soft material, and the inner layer 10*b* is made of hard materials such as plastic, metal, etc. The inner layer 10*b* provides support for the outer layer 10*a* and the driving mechanism 20. In this embodiment, the massage portion 11 may be a single-layer structure, and includes the outer layer 10*a***.

In this embodiment, the outer layer **10*a* of the massage portion 11, the outer layer 10*a* of the base portion 52 and outer layer 10*a* of the rest of the shell 10 are integrally formed, thus not only simplifying production and assembly of the sexual stimulation device 100, but also improving the connection strength between the massage portion 11 and the outer layer 10*a*. During rotation of the massage portion 11 around the first axis X1, it can generate greater deformation without damage, further increasing the stimulation force and stimulation range of the massage portion 11 on the human body. In addition, the outer layer 10***a* encloses the inner layer 10*b*, which can achieve good sealing effect for the components inside the shell 10, thereby play a waterproof and dustproof role, and facilitating the cleaning and storage of the sexual stimulation device 100. For the sexual stimulation device 100 of the present application, it should be understood that the massage portion 11 and the outer layer 10*a* of shell 10 may be formed separately and then assembled together, so that the massage portion 11 can be selectively disassembled and replaced. In practical applications, the sexual stimulation device 100 can be formed with several massage portions 11 in different shapes and/or sizes. According to specific usage scenarios, the user can choose a corresponding massage portion 11 to ensure the stimulation effect. In this situation, the outer layer 10*a* is no longer limited to be formed by the same material as that of the massage portion 11. Soft materials such as silicone and rubber, as well as hard materials such as plastic and alloy, may be used to form the outer layer 10*a*.

Figure 5:
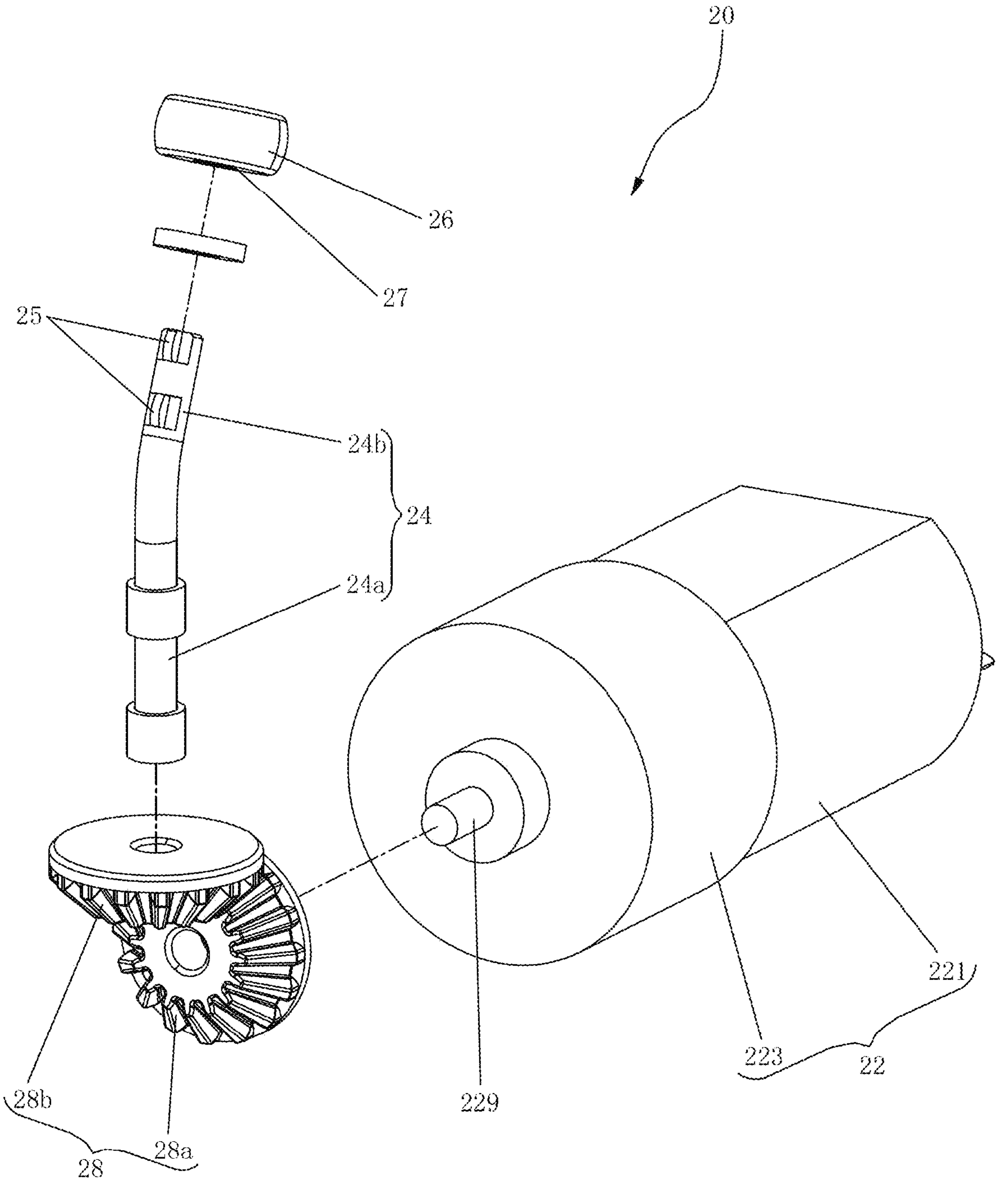
FIG. 5 is a further exploded view of a driving mechanism of the sexual stimulation device.
Figure 6:
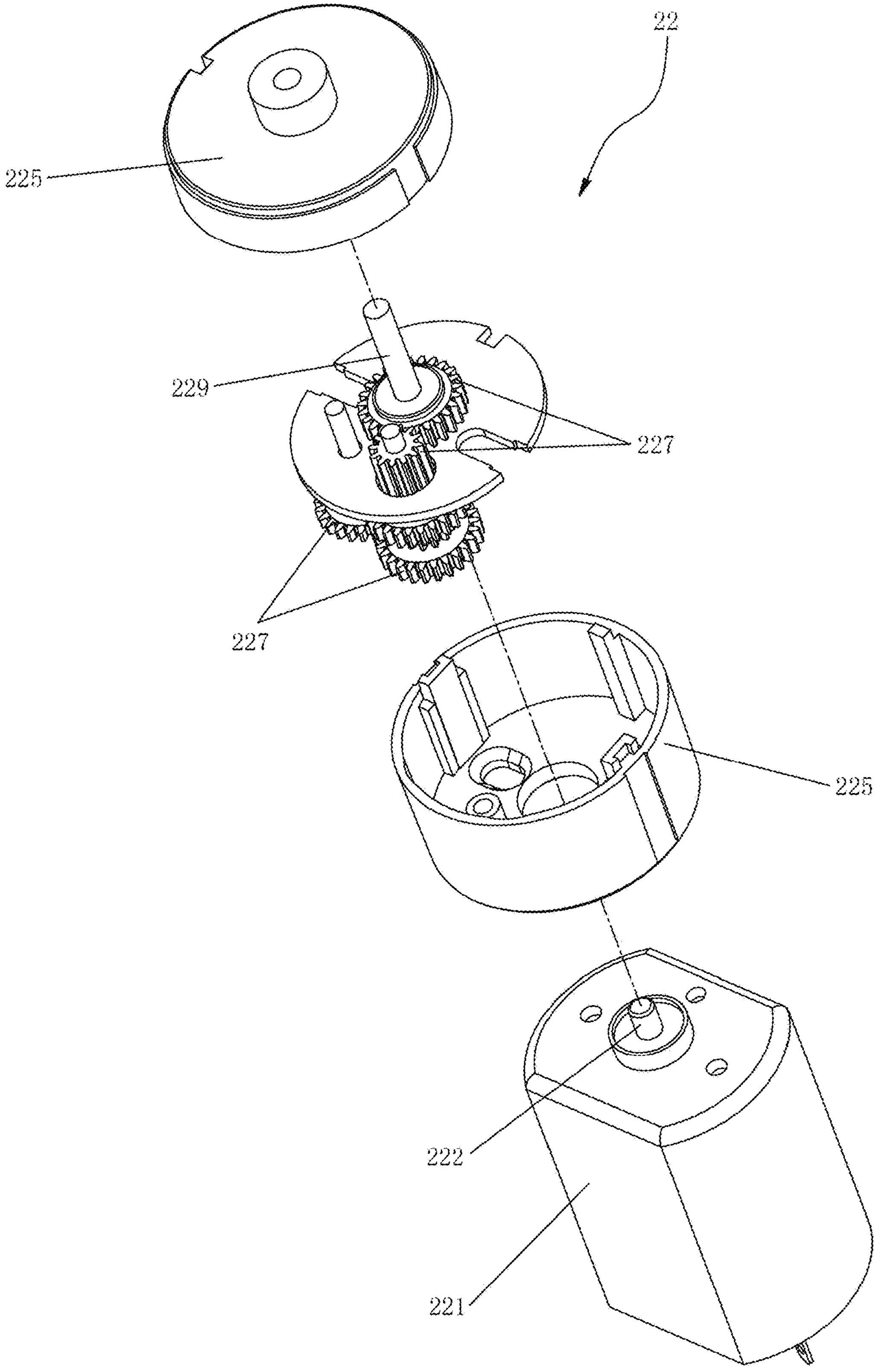
FIG. 6 is a further exploded view of a gearbox of the driving mechanism.

Referring to FIGS. 5-6, the driving mechanism 20 includes a driving module 22 and a first driving rod 24. The driving mechanism 20 is connected to the first driving rod 24 to drive the first driving rod 24 to rotate around the first axis X1. The first driving rod 24 includes a first end 24*a* and a second end 24*b*, and the second end 24*b* is inclined relative to the first end 24*a*. The first end 24*a* is connected to the driving module 22, and the second end 24*b* is inserted into and connected to the massage portion 11. A first vibration component 41, such as a vibration motor, is provided inside the massage portion 11. During rotating of the massage portion 11, it can vibrate at a predetermined frequency along with the first vibration component 41, which not only stimulates the sensitive area of the human body through kneading, but also generates deep stimulation through vibration. A combination of the two different types of stimulation makes the stimulated area of the human body, such as the sexual organs, such as the clitoris or the prostate, more excited, so that the users are more likely to reach orgasm with the help of the present sexual stimulation device 100, resulting in better sexual life and better sexual experience.

In this embodiment, a first angle $\alpha 1$ defined between the second end 24*b* and the first end 24*a*. The first end 24*a* of the first driving rod 24 extends along the first axis X1, and the second end 24*b* extends along a first central axis X3. A second angle $\beta 1$ is defined between the first central axis X3 and the first axis X1. Preferably, the second angle $\beta 1$ is an obtuse angle, and more preferably, the second angle $\beta 1$ is less than 45°. The first angle $\alpha 1$ between the first end 24*a* and the second end 24*b* is complementary with the second angle $\beta 1$ between the first axis X1 and the first central axis X3. That is, a sum of the first angle $\alpha 1$ and the second angle $\beta 1$ is 180°, i.e., $\alpha 1+\beta 1=180°$. In this way, the second angle $\beta 1$ between the first central axis X3 and the first axis X1 can be determined according to the first angle $\alpha 1$ between the first end 24*a* and the second end 24*b* of the first driving rod 24, thereby determining a rotation radius of the massage portion 11. In this embodiment, the massage portion 11 is generally coaxial with the second end 24*b* of the first driving rod 24, that is, the first central axis X3 is a central axis of the massage portion 11.

As shown in FIG. 6, the driving module 22 includes a motor module 221, a first gear 223 and a second gear 224. The first gear 223 is connected to an output shaft 2211 of the motor module 221, the second gear 224 and the first gear 223 mesh with each other, and the first end 24*a* of the first driving rod 24 is connected to the second gear 224. The motor module 221 may be a DC motor, and has the output shaft 2211 rotating at high-speed. The motor module 221 runs to drive the first gear 223 and the second gear 224 to rotate, and further drives the first driving rod 24 to rotate, thus driving the massage portion 11 to rotate around the first axis X1. In a specific embodiment, the first gear 223 and the second gear 224 are bevel gears, so that a rotation axis of the first driving rod 24 and a rotation axis of the output shaft 2211 of the motor module 221 intersect (the rotation axes perpendicularly intersect in the embodiment shown in FIG. 2), thus facilitating to arrange the driving module 22 to minimize the sexual stimulation device 100. It should be understood that the first gear 223 and the second gear 224 may be replaced by other transmitting mechanisms such as cylindrical gears, worm and worm wheel. Moreover, a transmitting module (such as one or more gear) may be disposed between the first gear 223 and the second gear 224.

In this embodiment, the massage portion 11 is provided at the front end of the shell 10, and the driving mechanism 20 is set adjacent to the front end of the shell 10 to facilitate the connection between the driving mechanism 20 and the massage portion 11. The first gear 223 and the second gear 224 perform as a steering unit between the driving module 22 and the first driving rod 24 for the convenience of arrangement of the driving module 22.

In a specific embodiment, the motor module 221 includes a motor and a gear unit connected between the first gear 223 and the motor. The reduction ratio of the gear unit is not less than 4:1 and not more than 100:1, and an output speed of the motor module 221 is not exceed 1000 rpm. That is, a speed of the output shaft 2211 of the motor module 221 does not exceed 1000 rpm, and accordingly, a speed of the first driving rod 24 and/or the massage portion 11 does not exceed 1000 rpm. In some embodiments, the motor module 221 may be connected to the first driving rod 24 directly, omitting the first gear 223 and the second gear 224. At this time, the output shaft 2211 of the motor module 221 may be inclined or perpendicular relative to the output shaft of the motor. In this situation, the gear unit may include bevel gears, etc., and the driving module 22 itself may achieve power transmission and change of the power transmission direction.

In a specific embodiment, the first vibrating component 41 may be integrally fixed inside the massage portion 11 during the process of forming the massage portion 11.

Figure 3:
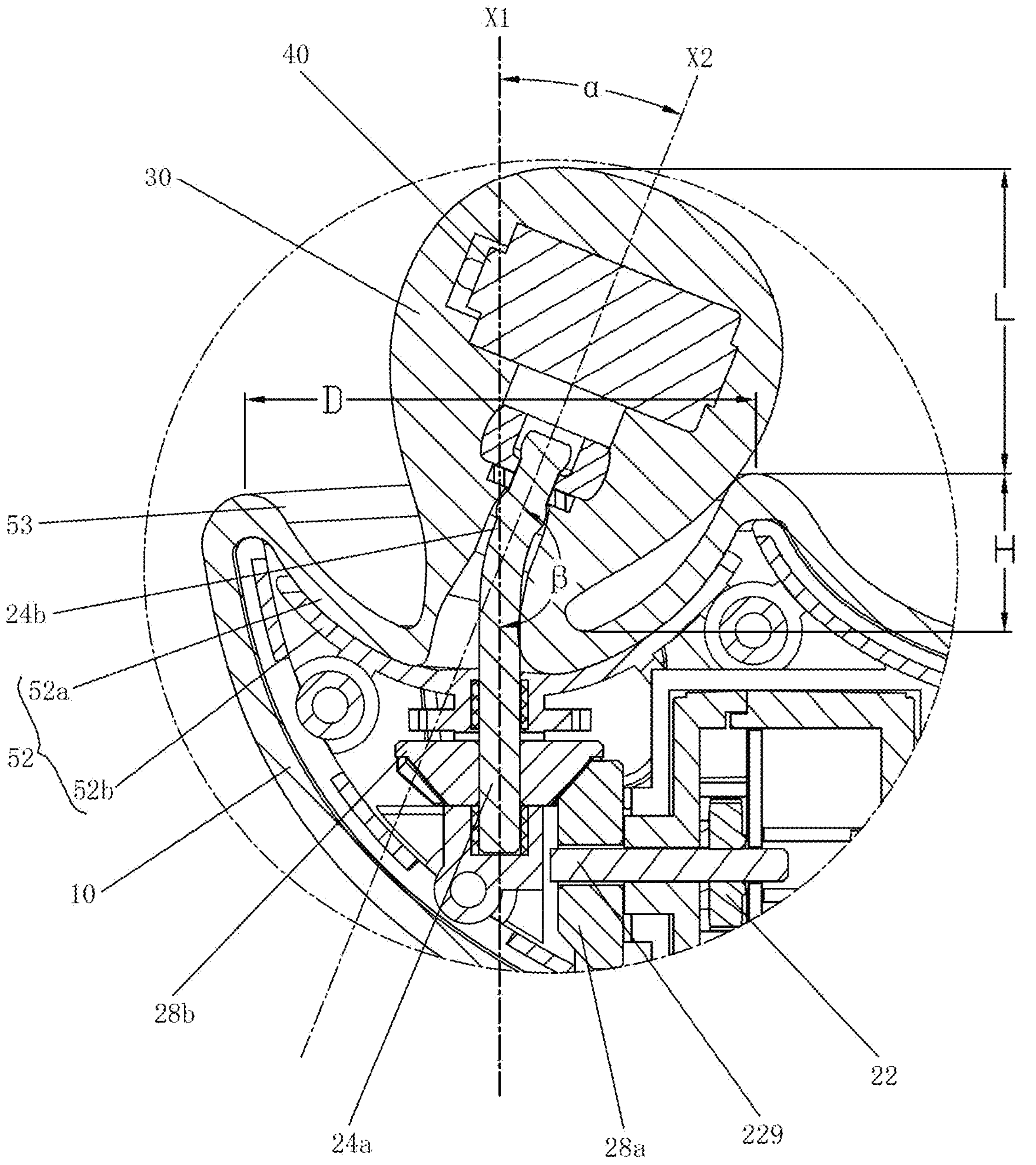
FIG. 3 is an enlarged view of circle III of FIG. 2.
Figure 4:
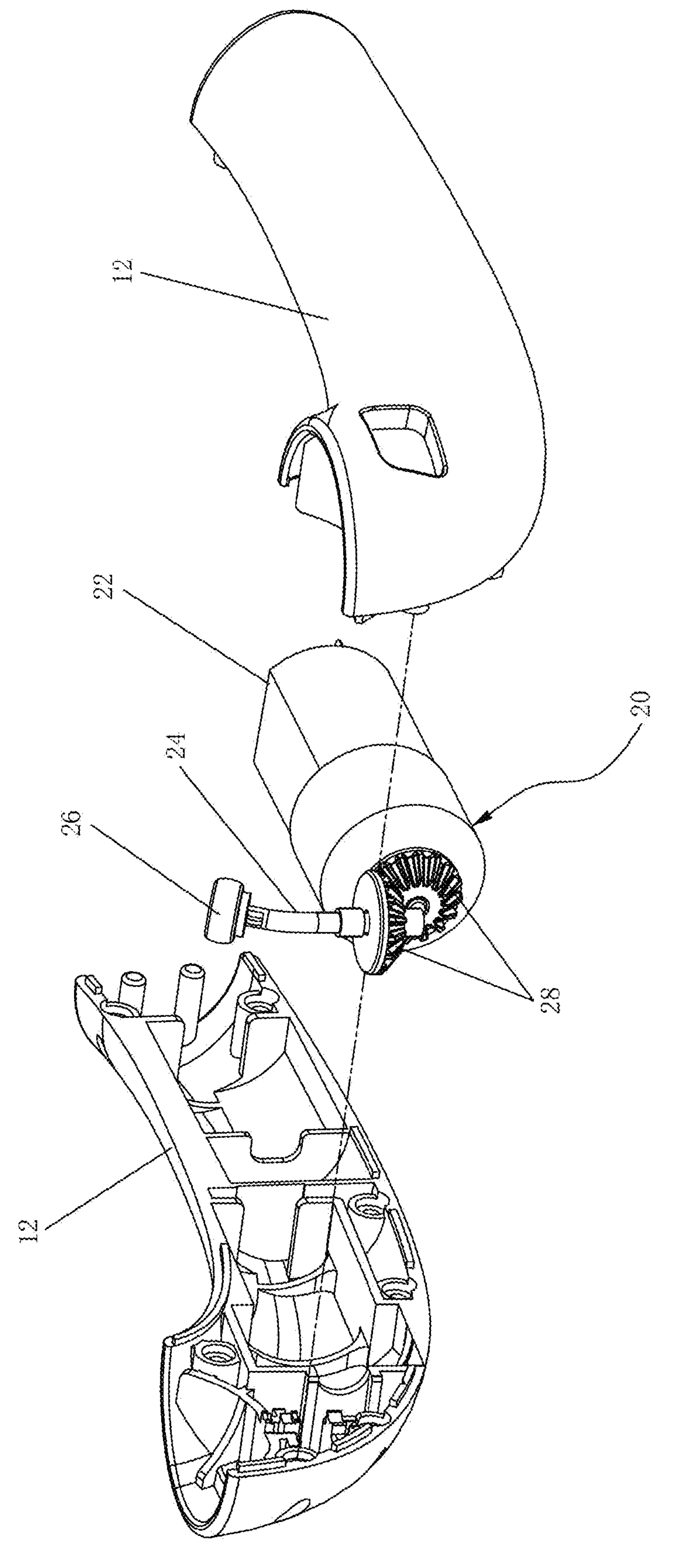
FIG. 4 is a schematic, exploded view of the sexual stimulation device of FIG. 1, wherein an outer shell is removed.

As shown in FIG. 3, along the first axis X1, a depth of the base portion 52 is less than the height of the massage portion 11, so that the massage portion 11 extends partially beyond the base portion 52 through the open side 521, making it be convenient to contact the human body. The first vibrating component 41 is fixed in a portion of the massage portion 11 extending beyond the base portion 52, so that the first vibrating component 41 can be closer to the human body. The first central axis X3 of the massage portion 11 is coaxial with or parallel to the central axis of the second end 24*b*, and the central axis of the base portion 52 is coaxial with or parallel to the central axis of the first end 24*a*, so that the massage portion 11 is eccentrically arranged relative to the base portion 52, facilitating swinging of the massage portion 11 inside the base portion 52. During swinging of the massage portion 11, a middle portion thereof is adjacent to the inner edge of the open side 521 of the base portion 52.

In actual use, the stimulated part of the human body may experience slight indentations under the action of massage portion 11. Correspondingly, a part of the human body around the stimulated part may protrude due to the indentations of the stimulated part. The base portion 52 further provides support and surrounding for the surrounding part of the stimulated part. The massage portion 11 protrudes outwardly relative to base portion 52 allows it to maintain contact with the indented stimulated part, further enhancing the stimulation effect. In some embodiments, the depth H of the base portion 52 is 5-10 mm, which may be 6.5 mm, 7.8 mm, and etc. The diameter D of the open side 521 of the base portion 52 is 20-50 mm, which may be 32 mm, 45 mm, and etc. The height L of the massage portion 11 extending beyond the open side 521 of the base portion 52 is less than 50 mm, which may be 18.5 mm, 35 mm, and etc.

Under the driving of the driving module 22, the first driving rod 24 drives the massage portion 11 to rotate around the first axis X1 at an appropriate speed, such as not exceeding 1000 rpm. The first end 24*a* of the first driving rod 24 rotates around its central axis, i.e., the first axis X1. The second end 24*b* and the massage portion 11 connected to the second end 24*b* rotate around the first axis X1/the first end 24*a*. The trajectory of massage portion 11 around the first axis X1 is generally circular, and the sensitive area of the human body covered by this circular trajectory can be kneaded by the massage portion 11, thereby enlarging the stimulation area and improving the stimulation effect.

Figure 7:
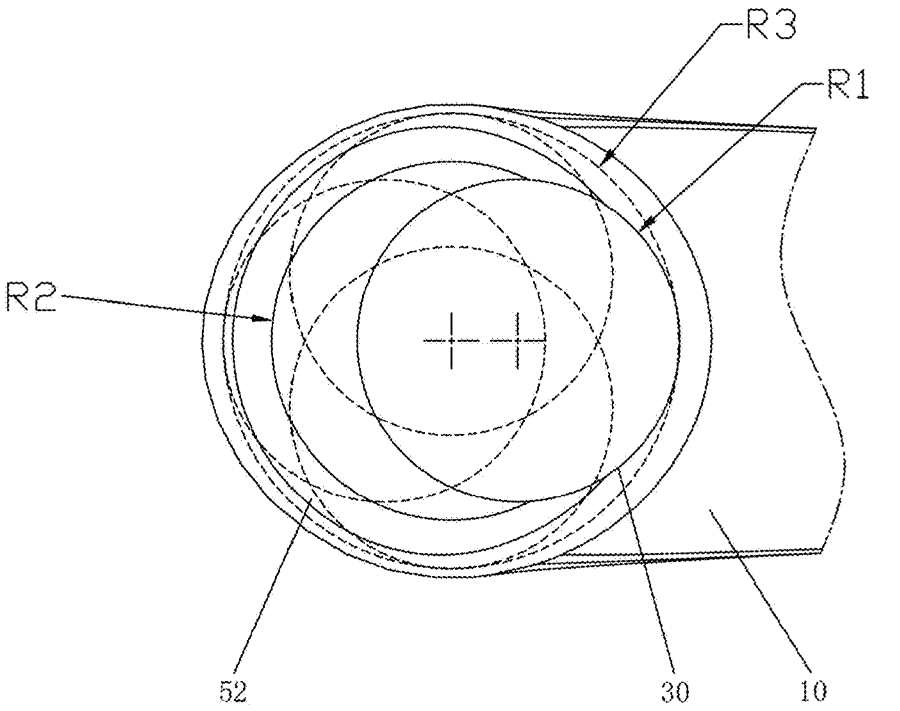
FIG. 7 is a schematic view of a trajectory of a massage portion of the sexual stimulation device of FIG. 1.

As shown in FIG. 7, on a plane perpendicular to the first axis X1, a projection of the massage portion 11 is generally a circle with a radius of R1, and a projection of the open side 521 of the base portion 52 is generally a circle with a radius of R2, wherein centers of the two projected circles are spaced from each other with a certain distance. During rotation of the massage portion 11 around the first axis X1, the base portion 52 may provide a support for the rotation of the massage portion 11 and limit the rotation trajectory of the massage portion 11. In this application, the massage portion 11 rotates around the first axis X1, and its trajectory is generally a circle with a radius of R3, wherein R3 is larger than R1, i.e., R3>R1.

For the existing devices, the human body are generally stimulated by high-frequency hitting. With the same massage portion 11, a stimulated area of the existing device is generally the circle with the radius of R1, while a stimulated area of the present device is generally the circle with the radius of R3. Therefore, without changing the size of the massage portion 11, an enlarged stimulation range on the human body can be obtained by changing the motion of the massage portion 11, thereby obtaining better stimulation effect. It should be understood that, based on the sexual organs to be stimulated, the massage portion 11 may have different sizes; and/or, the massage portion 11 may be deflected at different angles relative to the base portion 52, further improving the stimulation range of the massage portion 11 on the human body.

Figure 8:
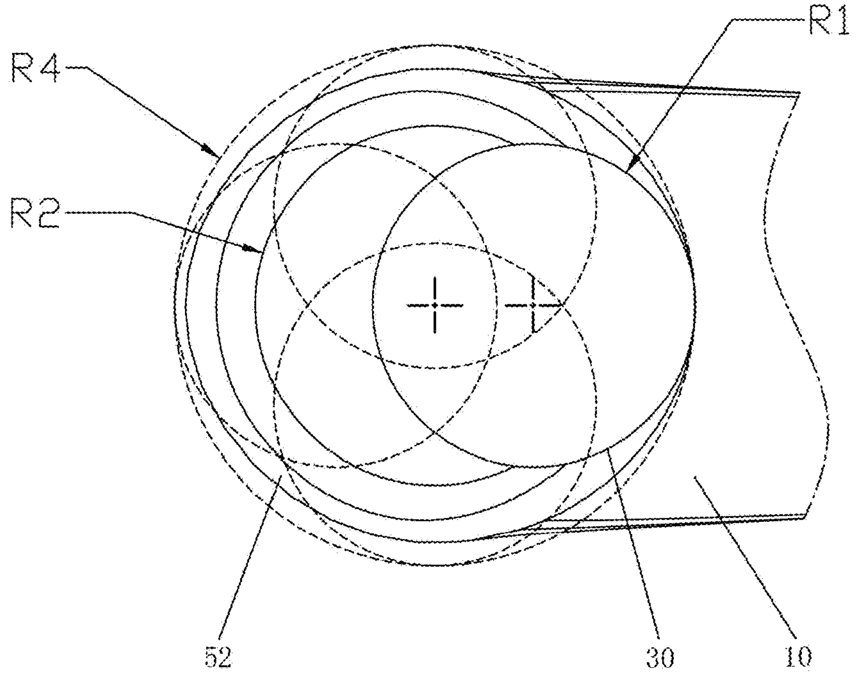
FIG. 8 is a schematic view of a trajectory of a massage portion of another sexual stimulation device.

In one embodiment, as shown in FIG. 8, the second angle $\alpha$1 between the first central axis X3 of the massage portion 11 and the first axis X1 is increased, and the sizes of the base portion 52 and the massage portion 11 are not changed. The distance between the center of the projection of the massage portion 11 on the plane perpendicular to the first axis X1 and the first axis X1 is increased. That is, the rotation radius of the massage portion 11 is increased to R4. In this way, the trajectory of the massage portion 11 is generally a circle with a radius of R4, wherein R4 is larger than R3, i.e., R4>R3. Due to the square relationship between area and radius, a little increase in the rotation radius of massage portion 11 may lead to a large increase in the stimulation range, further enhancing the stimulation effect.

In this embodiment, a first driving wheel 26 is mounted around the second end 24*b* of the first driving rod 24. Generally, the first driving wheel 26 is a flat and annular, and has a radial size larger than that of the first driving rod 24, so that it can better drive the massage portion 11 to rotate. During production, the first driving rod 24 and first driving wheel 26 may be pre-assembled and placed in the mold, and then, the massage portion 11 is formed by over-molding. The first driving wheel 26 may be fixed inside the massage portion 11 as on piece, effectively improving the connection stability therebetween. The massage portion 11, especially its end connected to the base portion 52, may have a clearance fit with the first driving rod 24, allowing the massage portion 11 to produce sufficient deformation during rotation with the first driving rod 24, making the rotation of the massage portion 11 smoother.

Preferably, the first driving wheel 26 has a first neck 27, and the first driving wheel 26 has the smallest inner diameter at the first neck 27. The second end 24*b* of the first driving rod 24 extends through the first neck 27 and forms two first protrusions 25 at two opposite axial sides of the first neck 27, respectively. The outer diameter of the protrusion 25 is larger than the inner diameter of the first neck 27. After assembly, the first protrusions 25 act as position limit components for the first neck 27, so that the first driving wheel 26 will not disengages from the first driving rod 24 without external force, facilitating the forming and manufacturing of the outer shell and massage portion 11 in the subsequent process. Of course, the first driving wheel 26 and the first driving rod 24 may also be fixed by other means, such as tight fitting, which is not limited in this application.

In this embodiment, and a plurality of buttons 31 are provided on the holding end, such as switch keys, function keys, etc. In the holding end of the shell 10, a control device, such as a control circuit board 33 is provided. The button 31 forms a control circuit with the driving module 22, the first vibrating component 41, and etc. through the control circuit board 33. The user can control the operation of the sexual stimulation device 100, such as adjust the speed and rotation direction of the driving module 22, adjust the vibration frequency of first vibrating component 41, etc. through the buttons 31. A battery 35, such as a rechargeable battery, is provided in the handle of the shell 10 and electrically connected to control circuit board 33, severing as the power source of the whole sexual stimulation device 100.

During the use of the sexual stimulation device 100, the users may choose different modes through the buttons 31 on the handle according to needs. For example, the users may only start the first vibrating component 41 to drive the massage portion 11 to perform high-frequency vibration, achieving a certain stimulation effect through vibration. Alternatively, the users may only start the driving module 22 to drive the massage portion 11 to rotate, producing a kneading stimulation effect on the human body. Alternatively, the users may simultaneously start the first vibrating component 41 and the driving module 22, making the massage portion 11 to vibrate and rotating, generating a dual stimulation effect on the human body, which is convenient to use and has a good stimulation effect.

Figure 9:
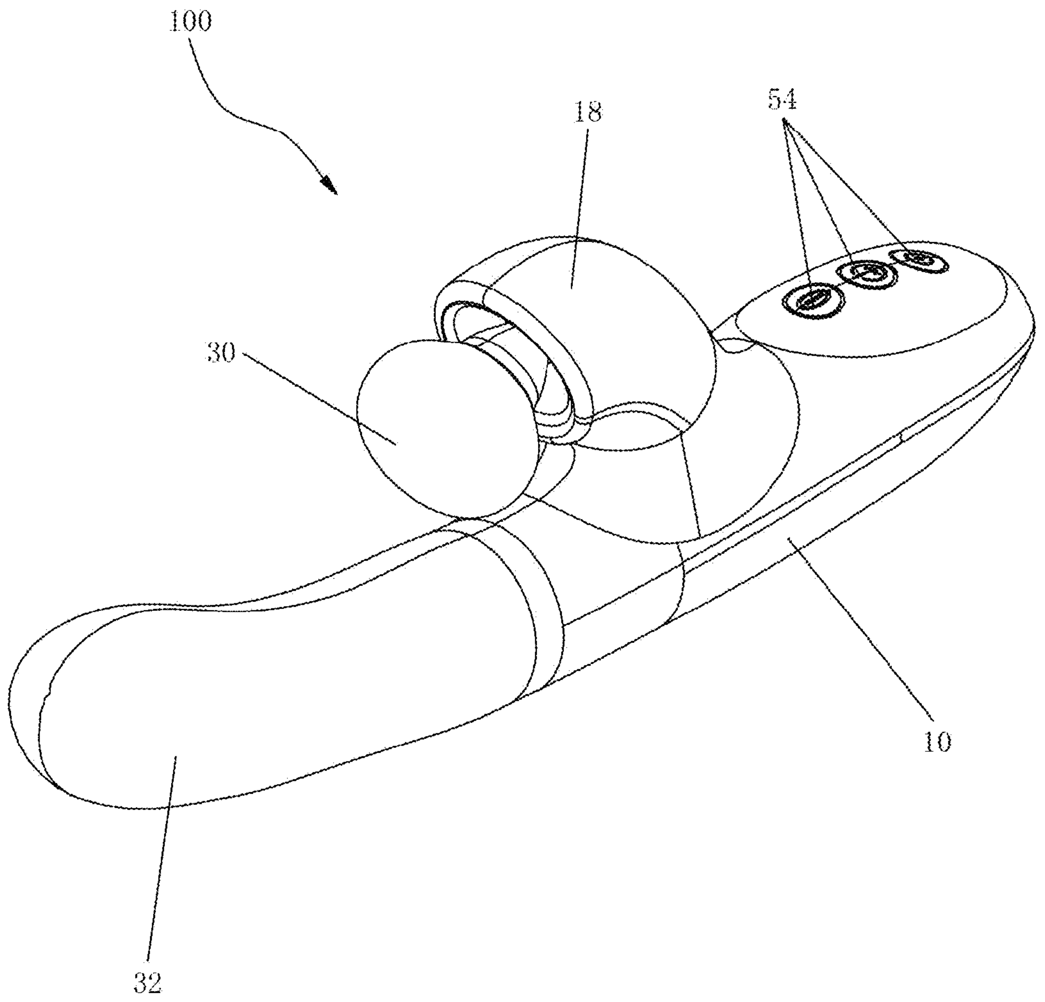
FIG. 9 is a schematic, assembled view of a sexual stimulation device according to a second embodiment of the present application.
Figure 10:
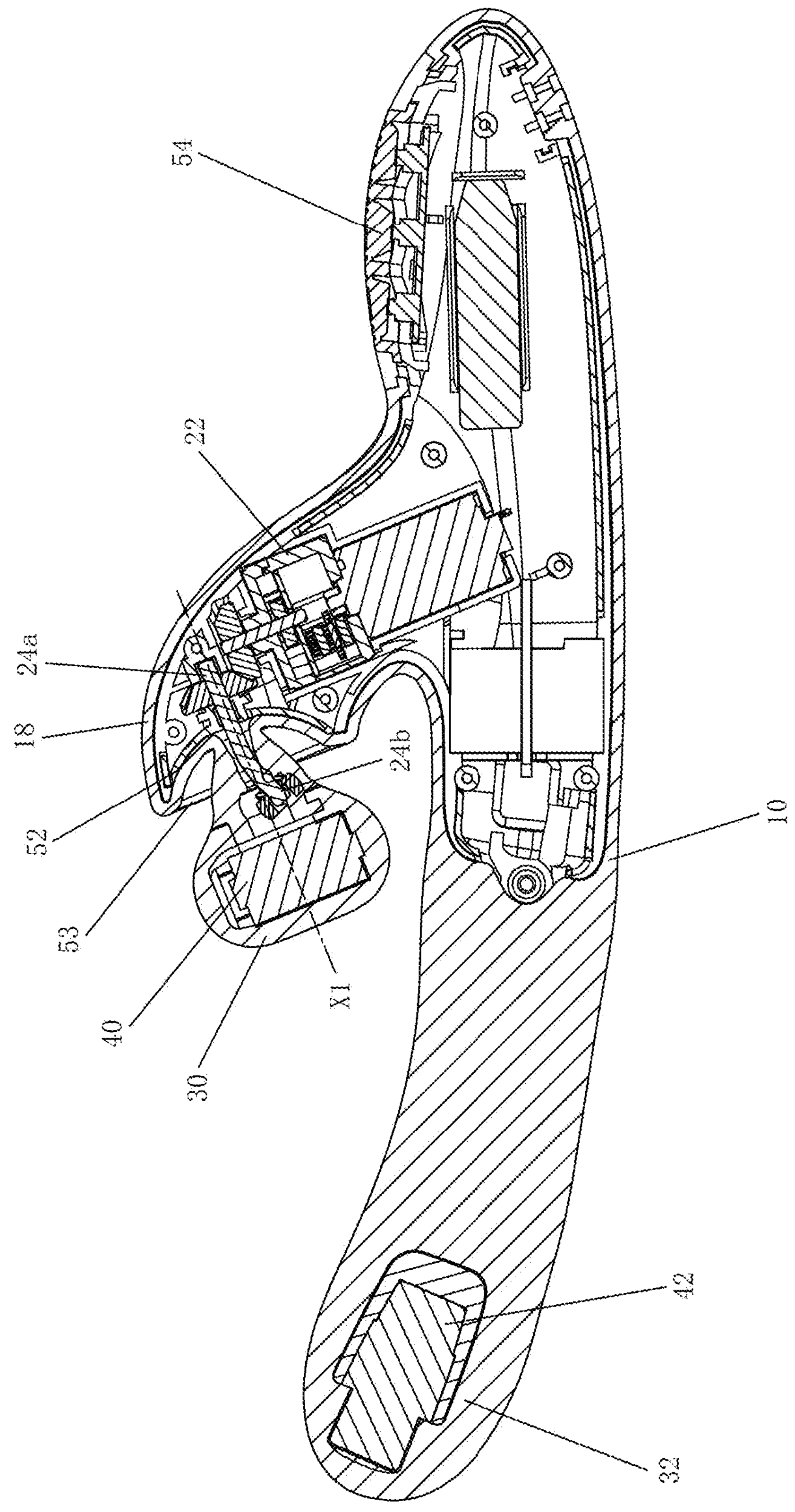
FIG. 10 is a cross sectional view of the sexual stimulation device of FIG. 9.

FIGS. 9-10 show a second embodiment of the sexual stimulation device of the present application, which differs from the first embodiment mainly in the massage portion 11. In this embodiment, the shell 10 of the sexual stimulation device 100 is generally elongated and rod-shaped. A branch 18 extends from the middle portion of the shell 10 curvedly towards an upper side of a front end of the shell 10, and a distal end of the branch 18 forms the base portion 52. The massage portion 11 is connected to the base portion 52. Specifically, the base portion 52 is concaved inwardly recessed to from a bowl-shaped portion on the shell 10. The massage portion 11 is set in the base portion 52 and partly extends beyond the base portion 52 through its open side 521. In this embodiment, the open side 521 of the base portion 52 is inclined at a certain angle towards the middle portion of the shell 10, and the massage portion 11 extends beyond the base portion 52 is close to the middle portion of the shell 10.

The shell 10 is provided with a driving mechanism 20, which includes a driving module 22 and a first driving rod 24. The first driving rod 24 includes a first end 24*a* and a second end 24*b* opposite to the first end 24*a*. The first end 24*a* is connected to the driving module 22, and the second end 24*b* is inserted into the massage portion 11. Under the action of the driving module 22, the massage portion 11 rotates along with the second end 24*b* around the first end 24*a*, forming an annular trajectory, which can generate a kneading effect on the human body. Similarly, the massage portion 11 is provided with a first vibrating component 41, such as a vibration motor, which allows the massage portion 11 to generate dual stimulation on the human body.

In this embodiment, the front end of the shell 10 forms a massage end 13, and a second vibrating component 42, such as a vibration motor, is provided inside the massage end 13. A holding end is formed on the rear end of shell 10 serving as a handle for holding of the sexual stimulation device 100. The holding end is equipped with buttons 31, etc., to control the operation of driving module 22, the first vibrating component 41 and the second vibrating component 42 etc. During use of the sexual stimulation device 100, the massage portion 11 and the massage end 13 act on two different parts of the human body, further improving the stimulation effect. For example, the massage end 13 may be used to stimulate the vagina while the massage portion 11 may be used to stimulate the clitoris. For another example, the massage end 13 may be used to stimulate the rectum while the massage portion 11 may be used to stimulate the prostate. In an alternatively embodiment, only one of the massage portion 11 and the massage end 13 has a vibrating component disposed therein.

In this embodiment, the driving mechanism 20 has the similar structure as the driving mechanism 20 in the first embodiment. The driving mechanism 20 of this embodiment is no more described in detail.

Figure 11:
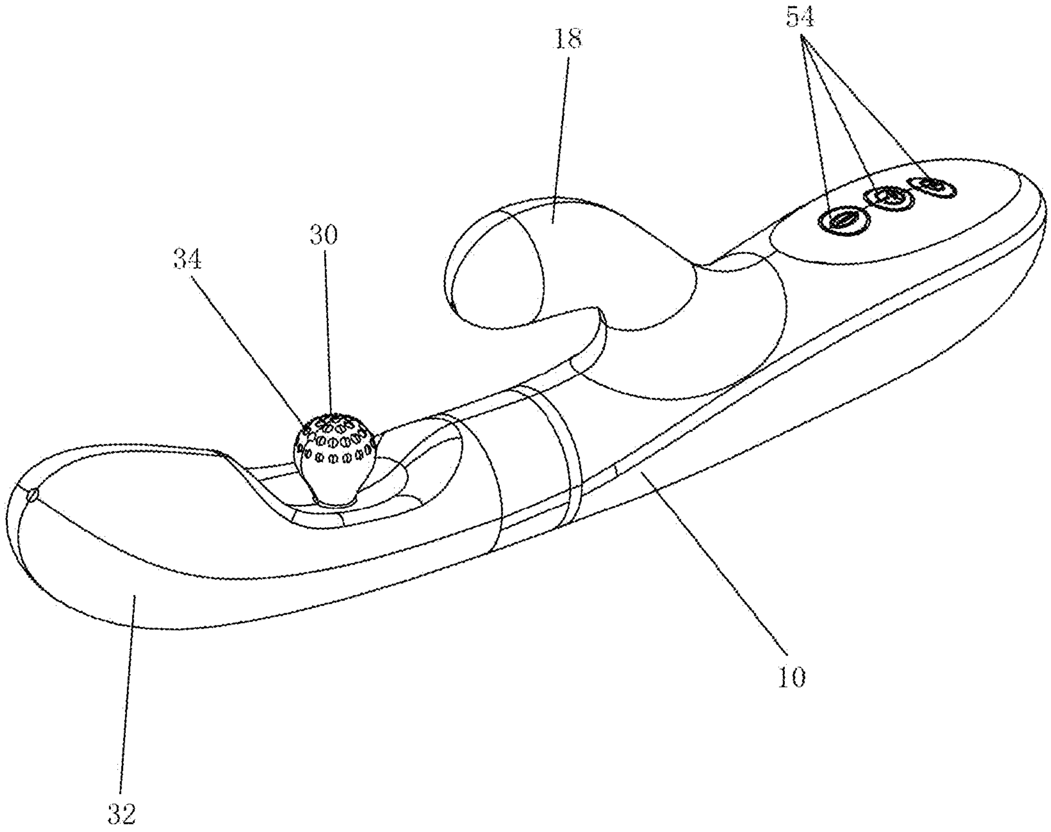
FIG. 11 is a schematic, assembled view of a sexual stimulation device according to a third embodiment of the present application.
Figure 12:
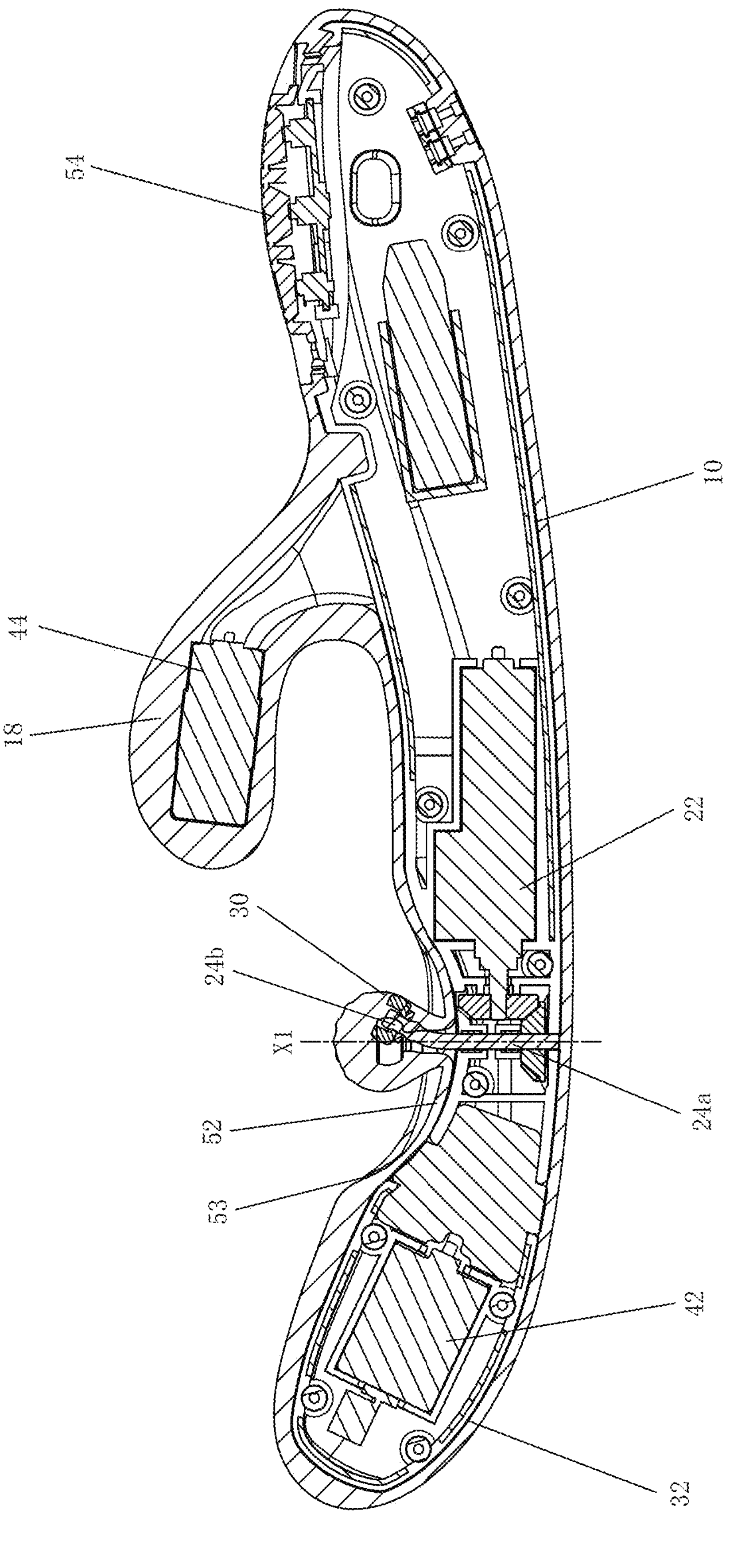
FIG. 12 is a cross sectional view of the sexual stimulation device of FIG. 11.
Figure 13:
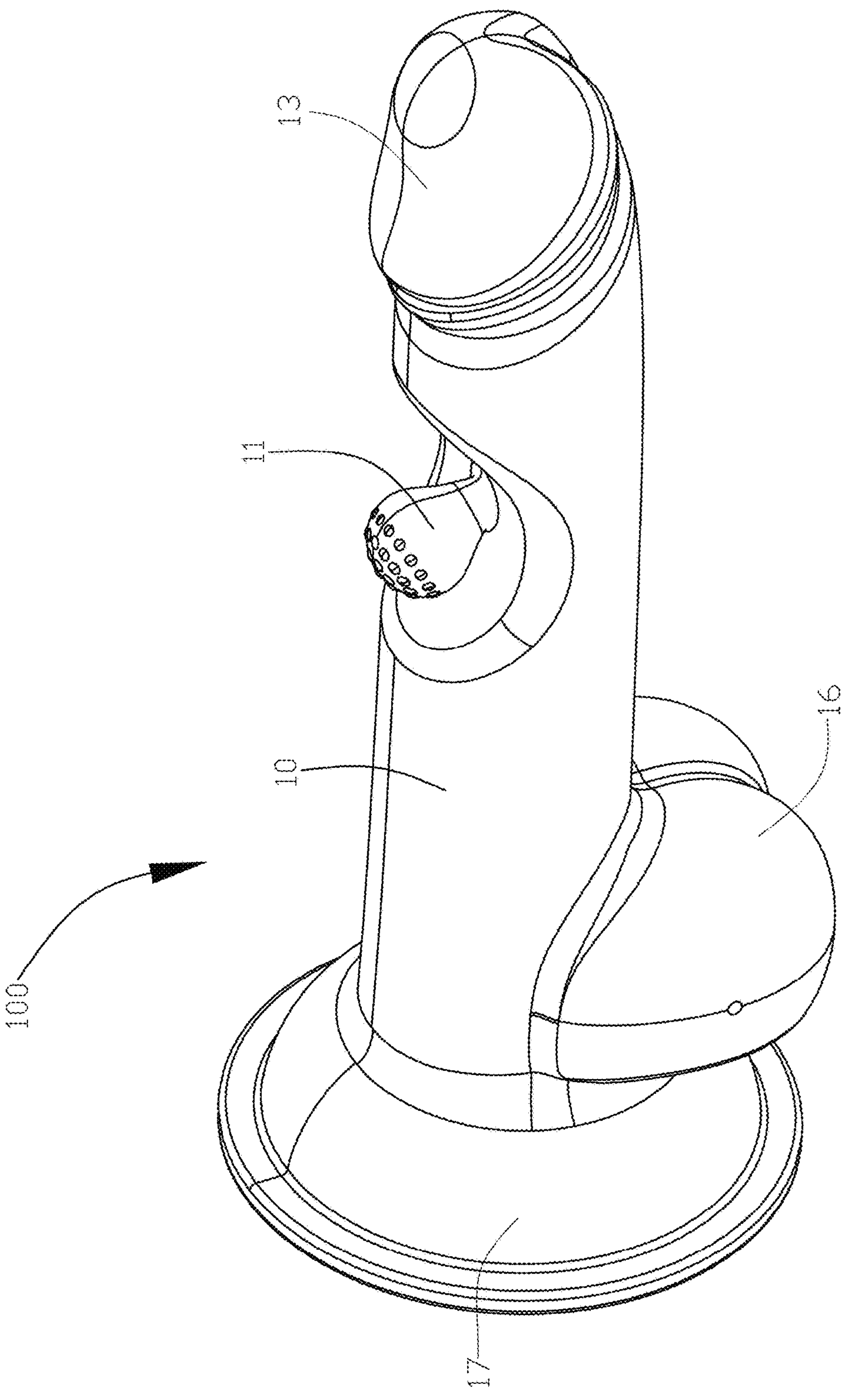
FIG. 13 is a schematic, assembled view of a sexual stimulation device according to a fourth embodiment of the present application.
Figure 14:
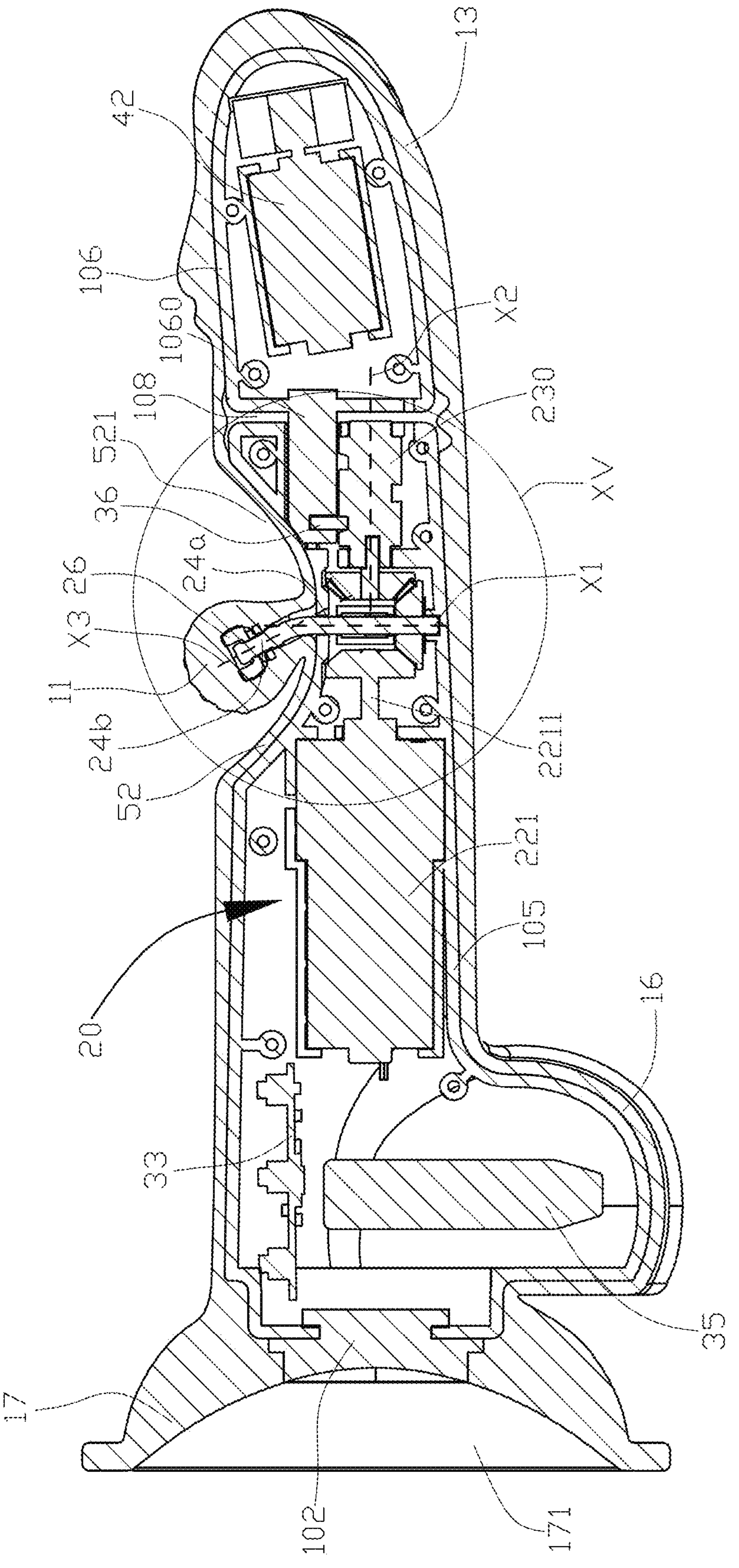
FIG. 14 is a cross sectional view of the sexual stimulation device of FIG. 13.
Figure 15:
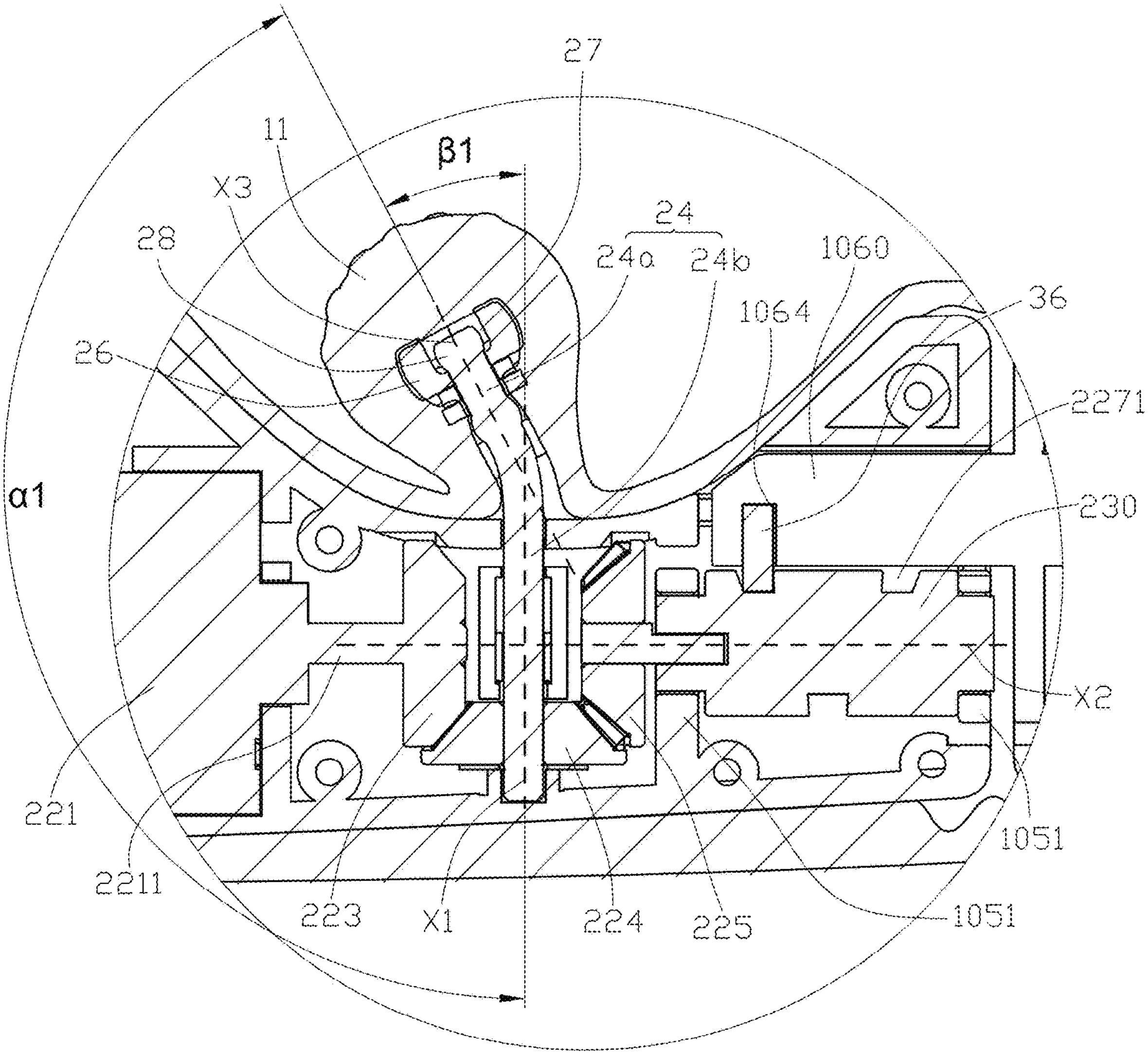
FIG. 15 is an enlarged view of circle XV of FIG. 14.
Figure 16:
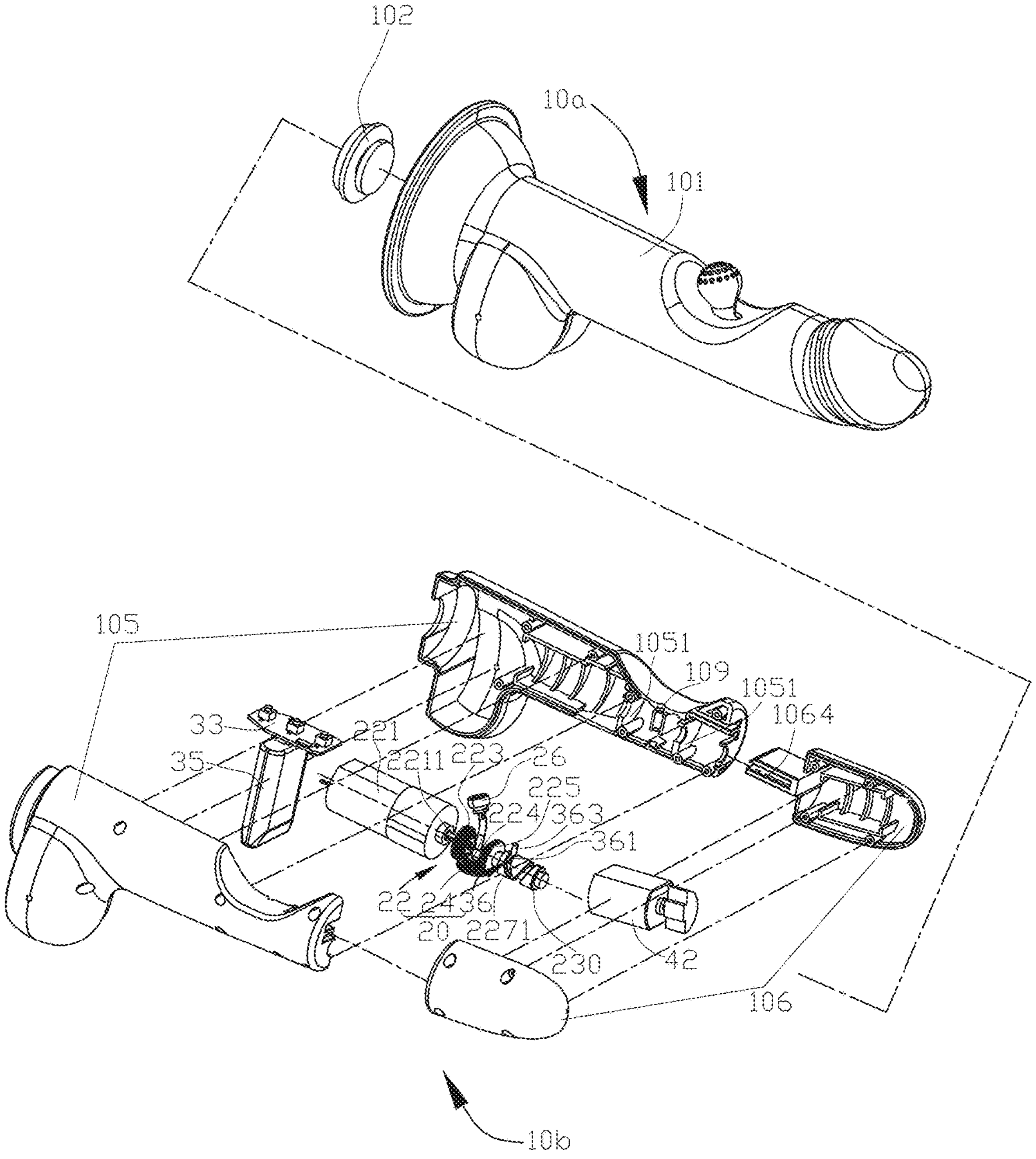
FIG. 16 is a schematic, exploded view of the sexual stimulation device of FIG. 13.
Figure 17:
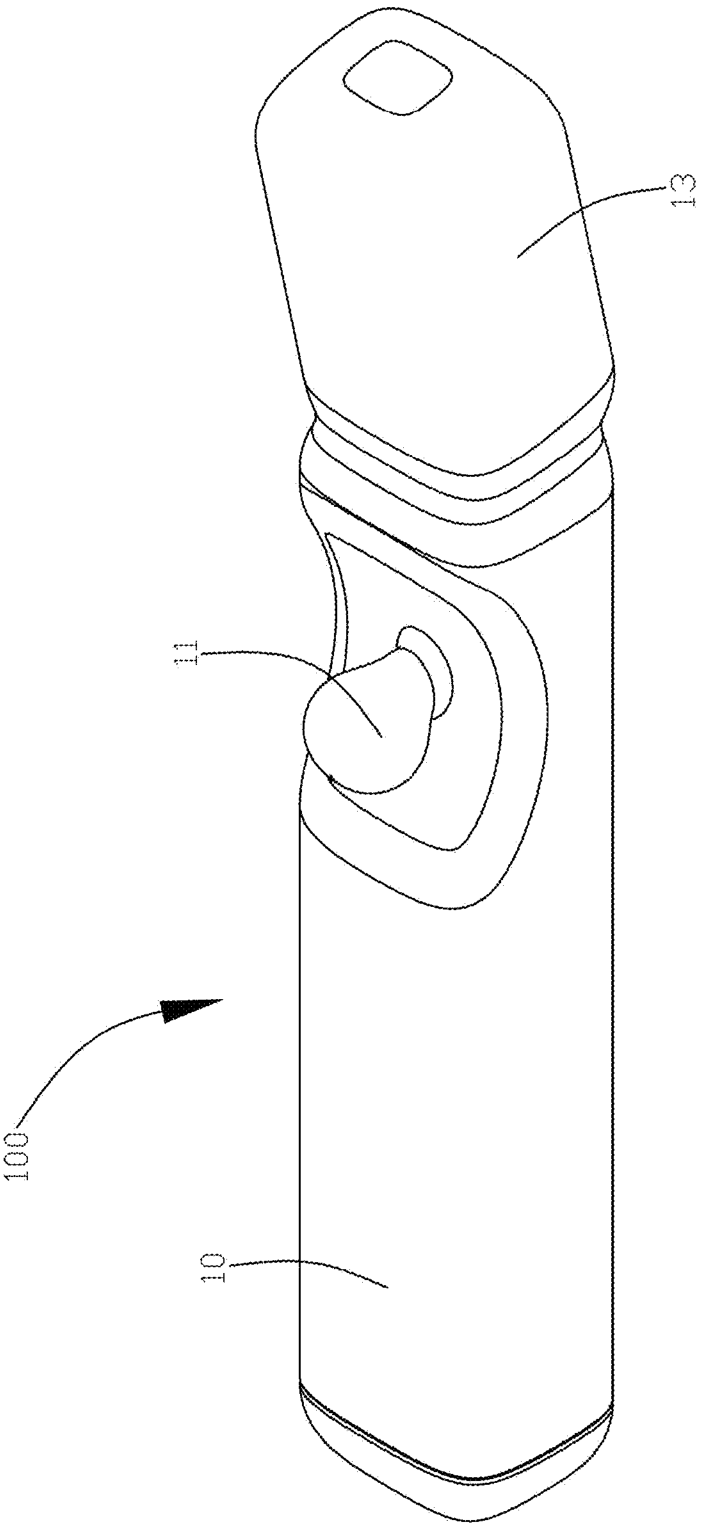
FIG. 17 is a schematic, assembled view of a sexual stimulation device according to a fifth embodiment of the present application.
Figure 18:
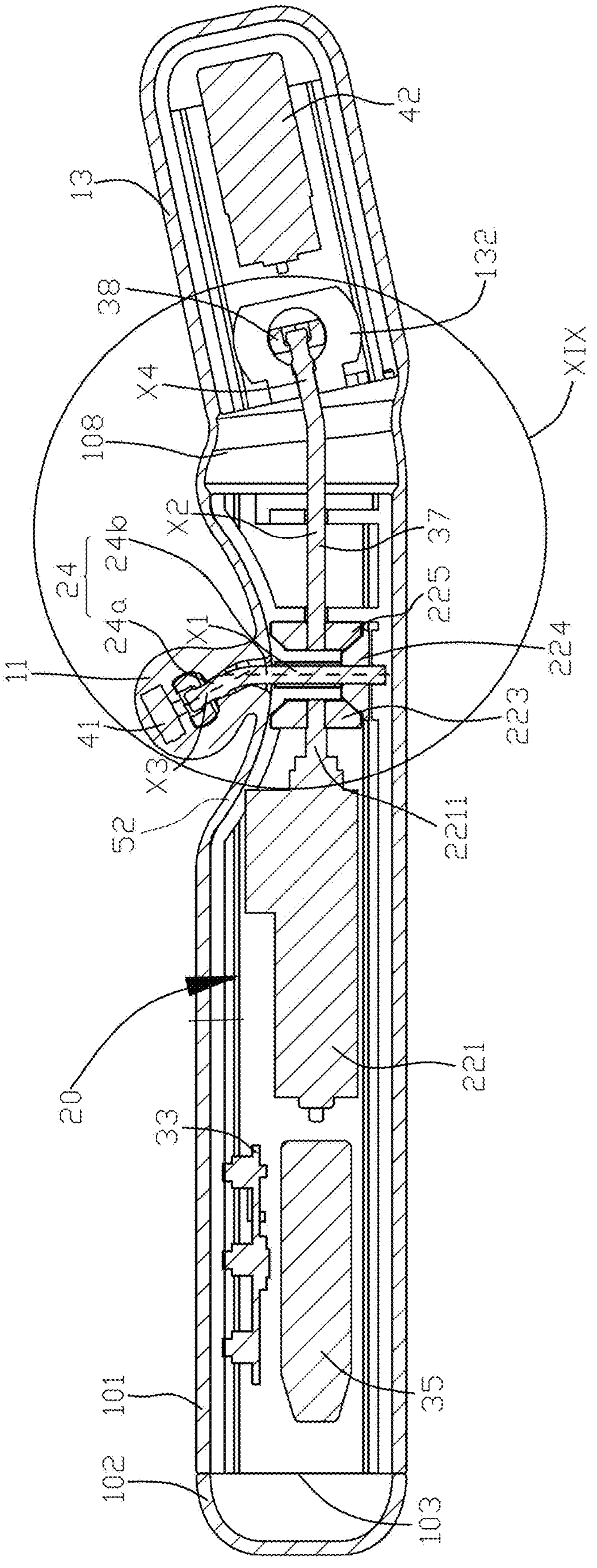
FIG. 18 is a cross sectional view of the sexual stimulation device of FIG. 17.
Figure 19:
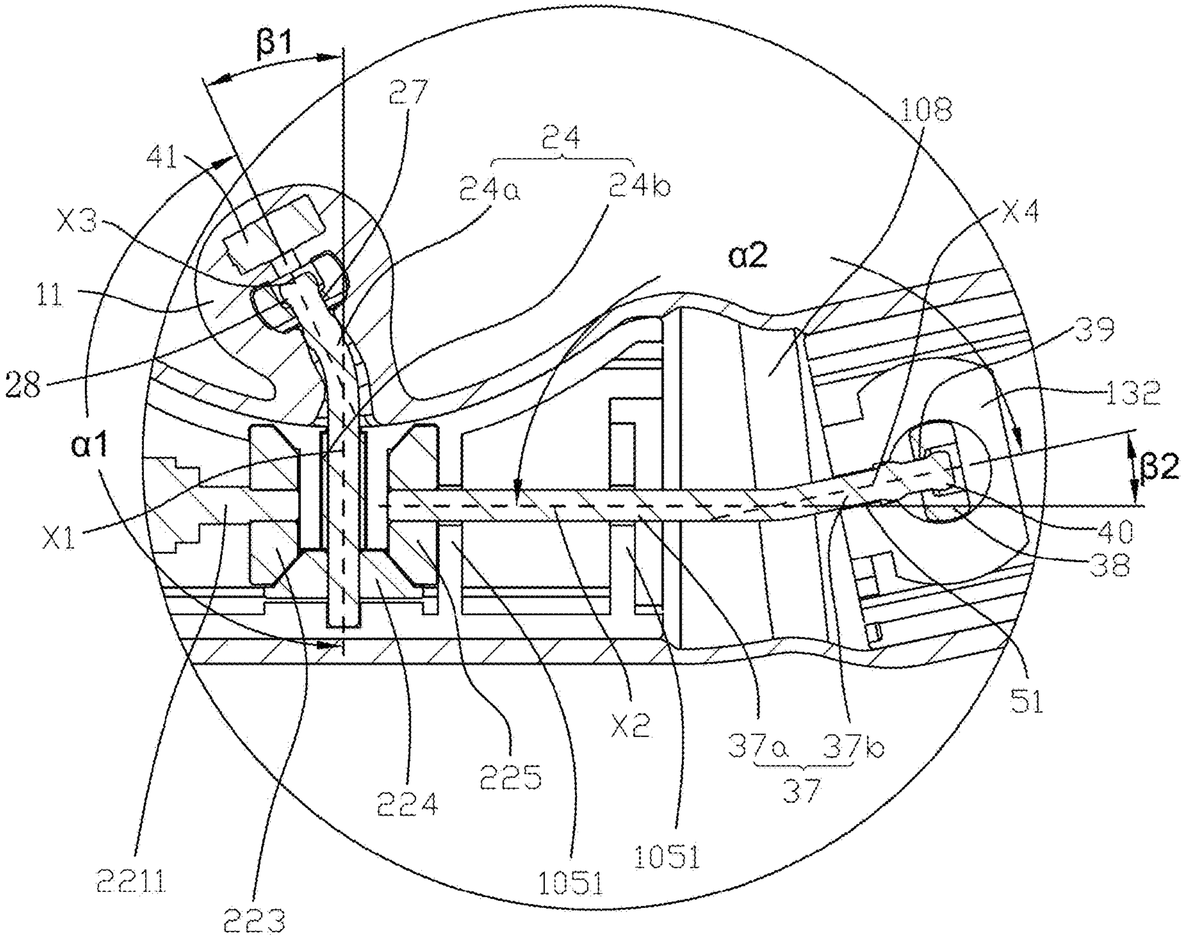
FIG. 19 is an enlarged view of circle XIX of FIG. 18.
Figure 20:
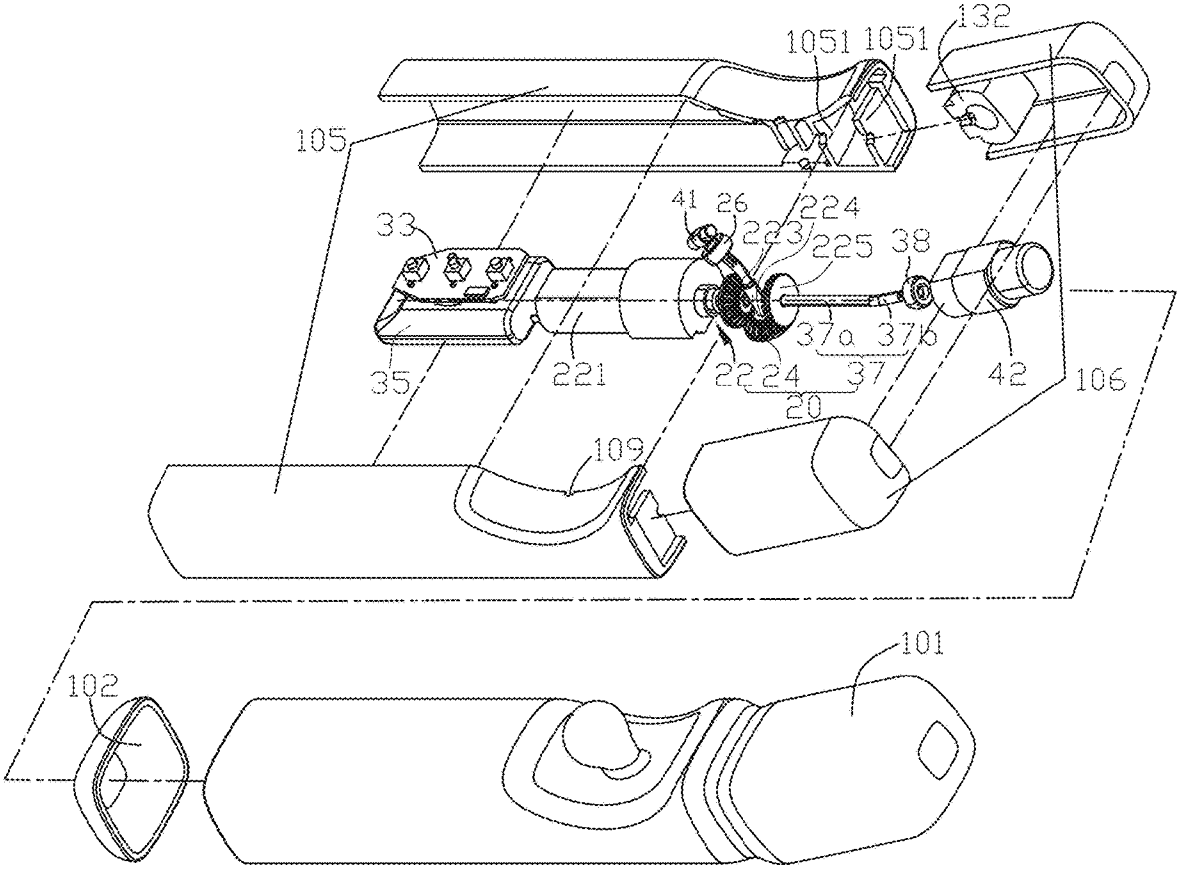
FIG. 20 is a schematic, exploded view of the sexual stimulation device of FIG. 17.
Figure 21:
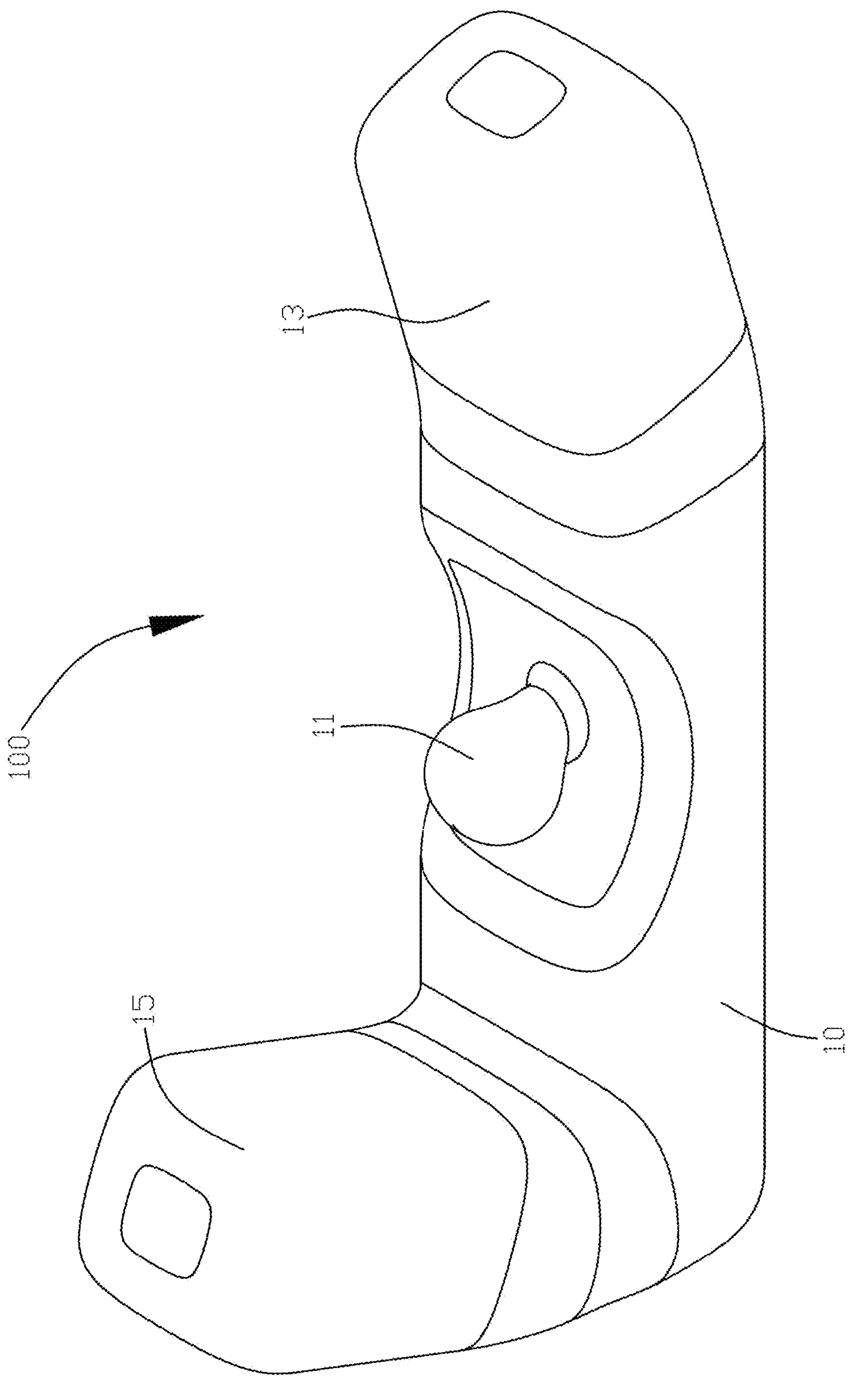
FIG. 21 is a schematic, assembled view of a sexual stimulation device according to a sixth embodiment of the present application.
Figure 22:
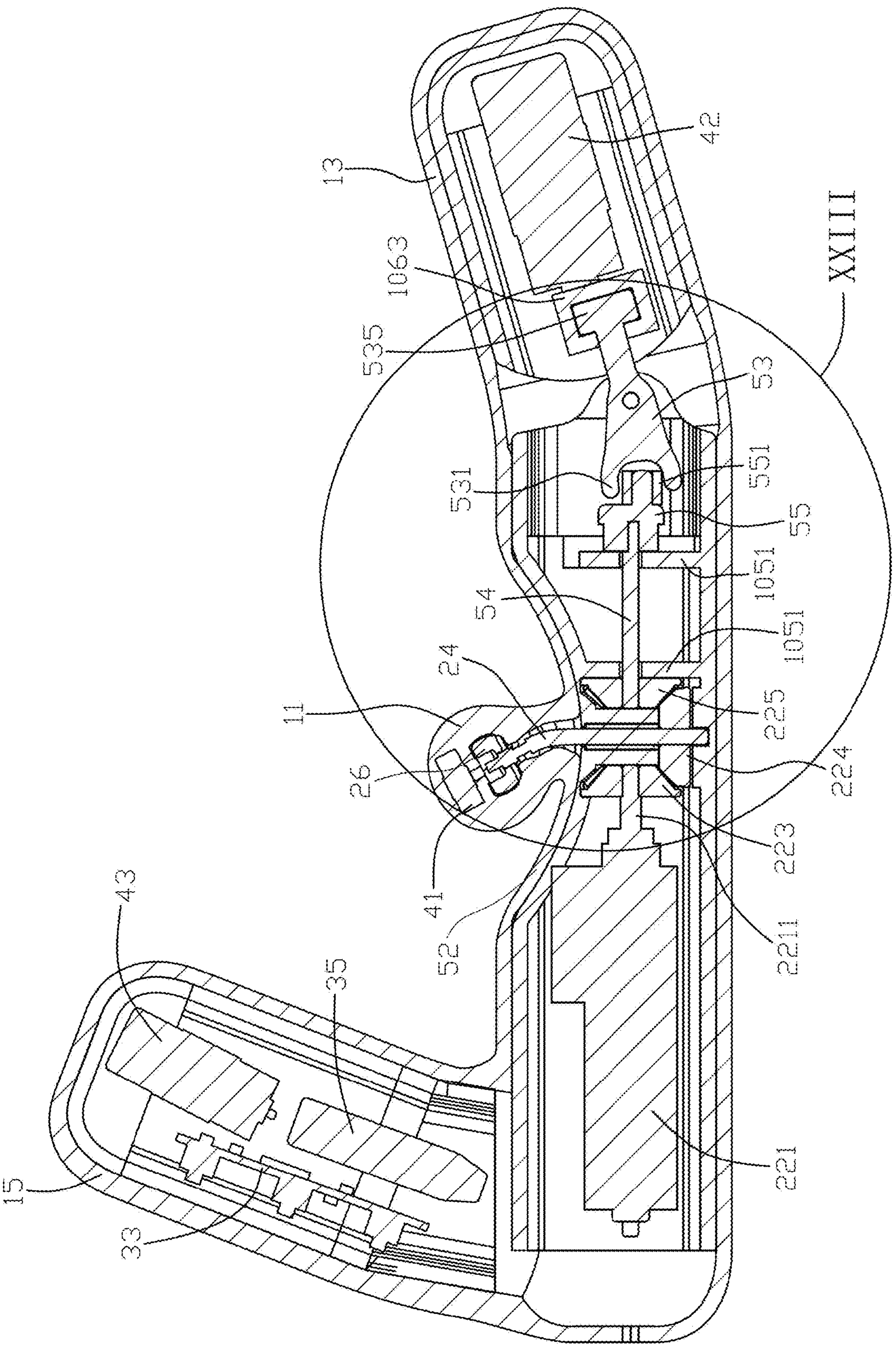
FIG. 22 is a cross sectional view of the sexual stimulation device of FIG. 21.
Figure 23:
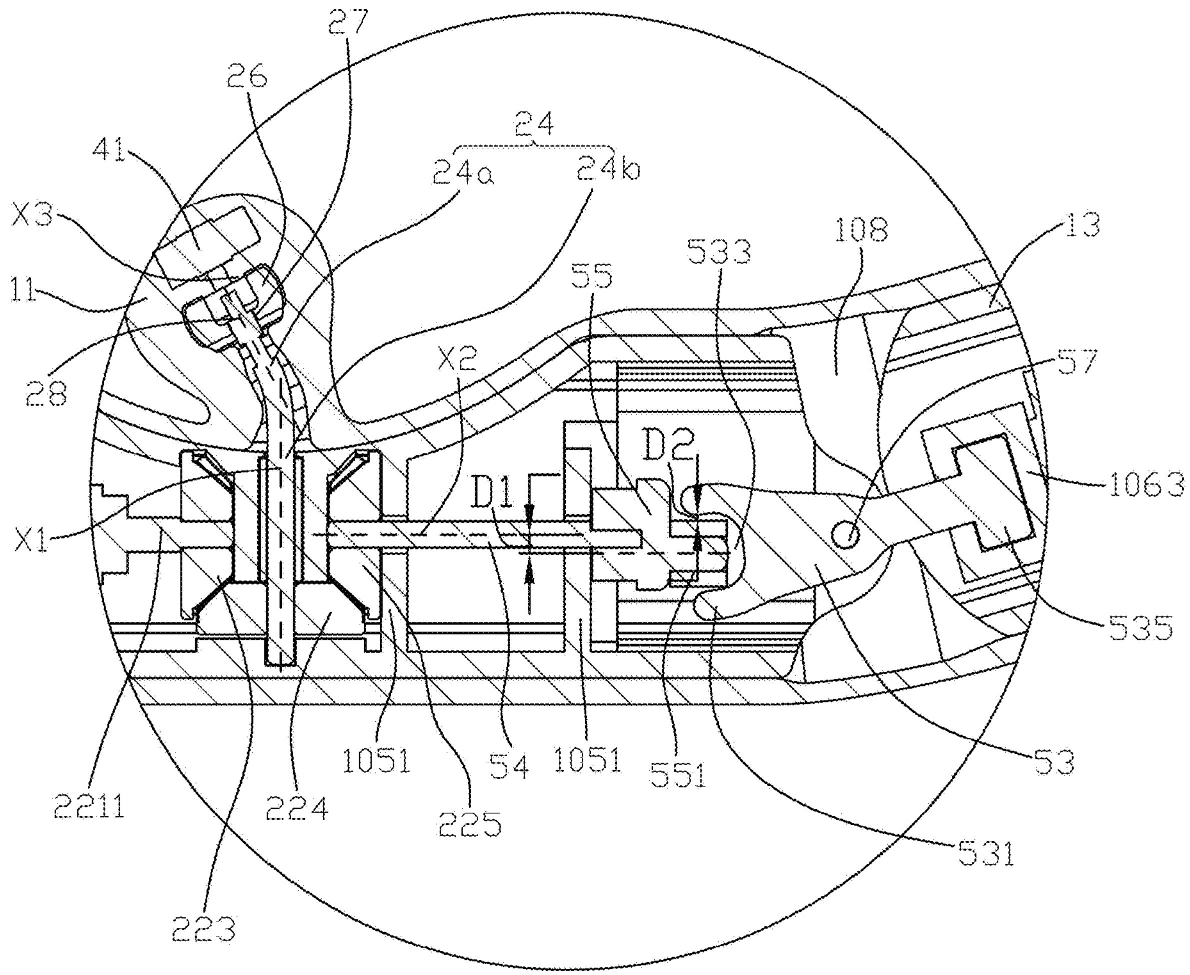
FIG. 23 is an enlarged view of circle XXIII of FIG. 22.
Figure 24:
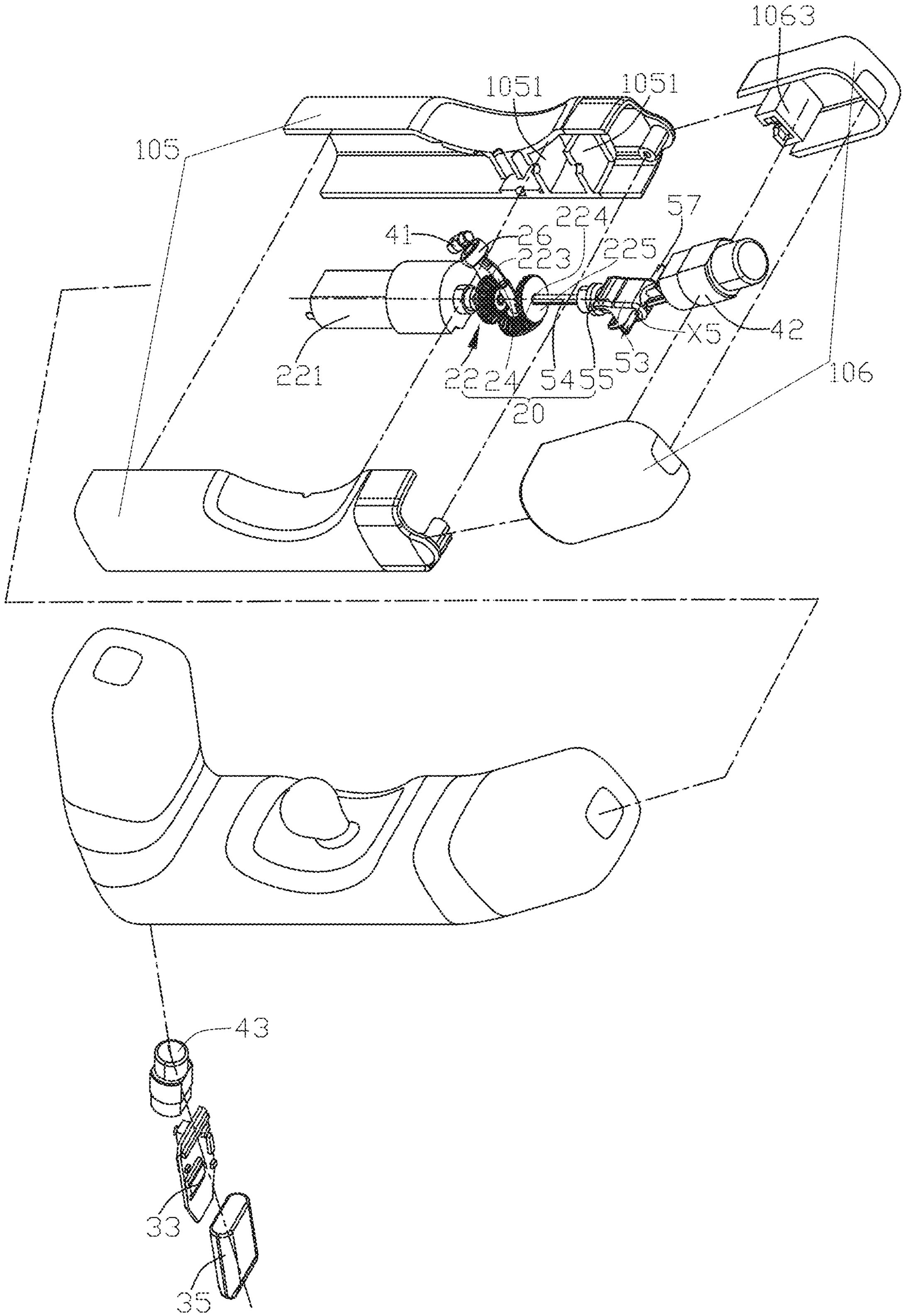
FIG. 24 is a schematic, exploded view of the sexual stimulation device of FIG. 21.
Figure 25:
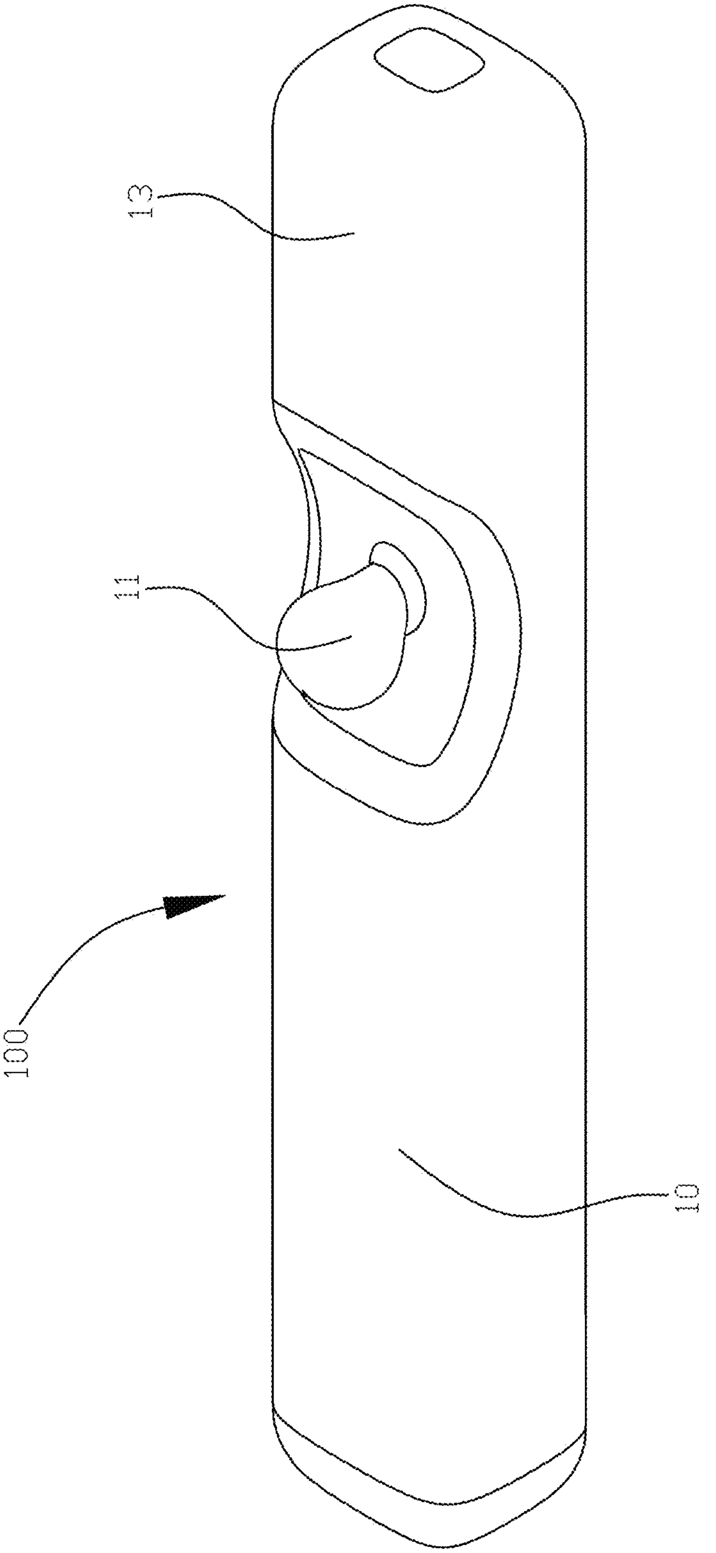
FIG. 25 is a schematic, assembled view of a sexual stimulation device according to a seventh embodiment of the present application.

FIGS. 11-12 show a third embodiment of the sexual stimulation device of the present application, which differs from the first embodiment mainly in the massage portion. In this embodiment, the shell 10 of the sexual stimulation device 100 is generally elongated and rod-shape. A middle portion of the shell 10 is laterally to form the base portion 52 and the massage portion 11 is connected to the base portion 52. Specifically, the middle portion of the shell 10 is concaved inwardly recessed to form the base portion 52. The massage portion 11 is set in the base portion 52 and partly extends beyond the base portion 52 through its open side 521. Preferably, protruding dots 34 are provided on an outer surface of the massage portion 11 to enhance the stimulation effect of the massage portion 11.

The shell 10 is provided with a driving mechanism 20, which includes a driving module 22 and a first driving rod 24. The first driving rod 24 includes a first end 24*a* and a second end 24*b* opposite to the first end 24*a*. The first end 24*a* is connected to the driving module 22, and the second end 24*b* is connected to the massage portion 11. Under the action of driving module 22, the massage portion 11 rotates along with the second end 24*b* around the first end 24*a*, forming an annular trajectory, which can generate a kneading effect on the human body.

In this embodiment, the front end of the shell 10 forms a massage end 13, and a second vibrating component 42, such as a vibration motor, is provided inside the massage end 13. A branch 18 extends from the middle portion of the shell 10 curvedly towards an upper side of a middle portion of the shell 10, and a third vibrating component 43, such as another vibration motor, is provided inside the branch 18. The branch 18 is disposed between the holding end and the base portion 52. A holding end is formed on the rear end of shell 10 serving as a handle for holding of the sexual stimulation device 100. The holding end is equipped with buttons 31 to control the operation of the driving module 22, the first vibrating component 41, the second vibrating component 42, the third vibrating component 43, and etc. When this sexual stimulation device is in use, the massage portion 11, the massage end 13, and the branch 18 may respectively act on three different parts of the human body, for example, the massage end 13 may be used to stimulate the vagina, the massage portion 11 may be used to stimulate the crus of clitoris, and the branch 18 may be used to stimulate the glans of clitoris, further improving the stimulation effect. In an alternatively embodiment, one of the massage portion 11, the massage end 13 and the branch 18 has a vibrating component disposed therein, or two of the massage portion 11, the massage end 13 and the branch 18 each has a vibrating component disposed therein.

In this embodiment, the driving mechanism 20 has the similar structure as the driving mechanism 20 in the first embodiment. The driving mechanism 20 of this embodiment is no more described in detail.

FIGS. 13-16 show a fourth embodiment of the sexual stimulation device 100 of the present application, which differs from the third embodiment mainly in the branch 18 and the massage end 13. In this embodiment, the shell 10 of the sexual stimulation device 100 is generally elongated and rod-shape. In this embodiment, the branch 18 is omitted, and the massage end 13 is movable along the second axis X2. That is, in this embodiment, the shell 10 is provided with a massage portion 11 and a massage end 13, and the driving mechanism 20 is connected to the massage portion 11 and the massage end 13 respectively in a transmission way. Under the action of the driving mechanism 20, the massage portion 11 rotates around a first axis X1 to form an annular trajectory, and the massage end 13 moves back and forth along a second axis X2 to form a reciprocating trajectory. A sensitive area of the human body, such as the clitoris, the vagina of the woman, the rectum, the prostate of the man, as long as it is covered by the annular trajectory of the massage portion 11, can be stimulated by the massage portion 11. A sensitive area of the human body, such as the vagina of the woman, the rectum of the woman/man, as long as it is covered by the reciprocating trajectory of the massage end 13, can be stimulated by the massage end 13 by rubbing with the massage end 13. During use of the sexual stimulation device 100, the massage portion 11 and the massage end 13 simultaneously act on two different parts of the human body, further improving the stimulation effect.

In this embodiment, almost whole of the shell 10 may be a double-layer structure, and includes an outer layer 10*a* and an inner layer 10*b* inside the outer layer 10*a*. The outer layer 10*a* is made of soft material, and the inner layer 10*b* is made of hard materials such as plastic, metal, etc. The inner layer 10*b* provides support for the outer layer 10*a*, the driving mechanism 20, the circuit board 33 and the battery 35. Specifically, the outer layer 10*a* has an end open 103. The inner layer 10*b* has a cover 102 to enclose both an end of the inner layer 10*b* and the outer layer 10*a*. In this embodiment, after the inner layer 10*b* assembled with the inner components, the outer layer 10*a* may be integrally formed around the inner layer 10*b* by over-molding.

In this embodiment, the shell 10 further includes a holding end. A front end of the shell 10 forms the massage end 13, and a rear end of the shell 10 forms the holding end serving as a handle for holding of the sexual stimulation device 100. The massage portion 11 is disposed between the holding end and the passage end 13. Specifically, the massage end 13 is penis-shaped, cylinder-shaped or circular truncated cone-shaped.

Specifically, the shell 10 includes an expand portion 16 formed on the holding end. The expand portion 16 is scrotum-shaped. During use of the sexual stimulation device 100, the user can hold and fondle the scrotum-shaped expand portion 16 to stimulate the user, further improving the stimulation effect. Specifically, the shell 10 includes a terminal end 17 formed on the holding end. The terminal end 17 is dish-shaped. Specifically, the terminal end 17 is a single-layer structure, and includes the outer layer 10*a*, result in a flexible terminal end 17. The terminal end 17 has a concave cavity 171. The expand portion 16 is adjacent to the terminal end 17 and disposed between the terminal end 17 and the massage portion 11. In this embodiment, the circuit board 33 and the battery 35 are received in a cavity of the expand portion 16.

A middle portion of the shell 10 forms a base portion 52. The massage portion 11 is connected to the base portion 52. The sexual stimulation device further is concaved inwardly and laterally to form the base portion 52. The massage portion 11 is set in the base portion 52 and partly extends beyond the base portion 52 through its open side 521. Specifically, the inner layer 10*b* defines a through hole 109 to allow the first driving rod 24 to extend from interior to exterior of the inner layer 10*b*.

In this embodiment, the inner layer 10*b* of the shell 10 includes a first portion 105 corresponding to the holding end and the base portion 52, and a second portion 106 corresponding to the massage end 13. The first portion 105 and the second portion 106 depart from each other thus defining a gap 108 therebetween. The second portion 106 is movable relative to the first portion 105. When the second portion 106 moving back and forth, the outer layer 10*a* elongates or retracts along the second axis X2 and a width of the gap 108 variates, thus enabling the massage end 13 to move along the reciprocating trajectory. Specifically, the first portion 105 defines two bracket 1051 on an inner sidewall thereof. The second portion 106 has an extending portion 1060 extending into the first portion 105 and defining a latching slot 1064.

In this embodiment, the driving mechanism 20 includes a driving module 22 and a first driving rod 24. The first driving rod 24 includes a first end 24*a* and a second end 24*b* opposite to the first end 24*a*. The first end 24*a* is connected to the driving module 22, and the second end 24*b* is connected to the massage portion 11. Under the action of driving module 22, the massage portion 11 rotates along with the second end 24*b* around the first end 24*a*, forming an annular trajectory, which can generate a kneading effect on the human body. The driving module 22 includes a motor module 221, a first gear 223 and a second gear 224. The first gear 223 is connected to an output shaft 2211 of the motor module 221, the second gear 224 and the first gear 223 mesh with each other, and the first end 24*a* of the first driving rod 24 is connected to the second gear 224.

In this embodiment, the driving mechanism 20 further includes a sliding member 36, and the driving module 22 is connected to the sliding member 36 in a transmission way to drive the sliding member 36 moving along the second axis X2. The sliding member 36 is connected to the massage end 13. Under the action of the driving mechanism 20, the massage end 13 and the sliding member 36 is driven by the driving module 22 to move back and forth along the second axis X2.

In this embodiment, the driving module 22 further includes a third gear 225 and a screwed portion 230, and the third gear 225 meshes with the second gear 224. One end of the screwed portion 230 is connected to the third gear 225, and an opposite end of the screwed portion 230 defines a screwed slot 2271. The third gear 225 has a shaft connected to the screwed portion 230. The screwed portion 230 is rotatably supported by the brackets 1051 of the first portion 105. The sliding member 36 movably engages in the screwed slot 2271, thus forming a screw-nut mechanism. The motor module 221 runs to drive the first gear 223, the second gear 224, the third gear 225 and the screwed portion 230 to rotate, thus driving the sliding member 36 to linearly move. In this specifical embodiment, the third gear 225 is a bevel gear so that a rotation axis of the screwed portion 230 and a rotation axis of the output shaft 2211 of the motor module 221 are parallel to each other (the rotation axes are coaxial in the embodiment shown in FIG. 15), thus facilitating to arrange the driving module 22 to minimize the sexual stimulation device 100. It should be understood that the third gear 225 may be replaced by other transmitting mechanisms such as a cylindrical gear. In another embodiment, a transmitting module (such as one or more gear) may be disposed between the second gear 224 and the third gear 225. The screw-nut mechanism may also be replaced by other transmitting mechanisms such as a rack steering mechanism that transmitting a rotation to linear movement.

Specifically, the sliding member 36 includes an engaging portion 361 and a pin portion 363. The engaging portion 361 is arc-shaped so as to perfectly engage with the helical screwed slot 2271. The pin portion 363 is inserted in the latching slot 1064 of the second portion 106, so that the sliding member 36 and the second portion 106 move along the second axis X2 when the screwed portion 230 rotates.

In this embodiment, both of the massage portion 11 and the massage end 13 are driven by the same motor module 221 to reduce the cost and decrease the cavity occupied by the driving mechanism 20 to minimize the sexual stimulation device 100. It should be understood that in other embodiment, the massage portion 11 and the massage end 13 may be driven by two motor modules respectively.

FIGS. 17-20 show a fifth embodiment of the sexual stimulation device of the present application, which differs from the fourth embodiment mainly in the massage end 13 and the holding end. The shell 10 of the sexual stimulation device 100 is generally elongated and rod-shape, and the massage end 13 is inclined relative to the holding end. In this embodiment, the expand portion 16 and the terminal end 17 are omitted. Also, in this embodiment, the massage end 13 is rotatable around the second axis X2. That is, in this embodiment, the shell 10 is provided with a massage portion 11 and a massage end 13, and the driving mechanism 20 is connected to the massage portion 11 and the massage end 13 respectively in a transmission way. Under the action of the driving mechanism 20, the massage portion 11 rotates around a first axis X1 to form an annular trajectory, and the massage end 13 rotates around a second axis X2 to form an annular trajectory. A sensitive area of the human body, such as the clitoris, the vagina of the woman, the rectum, the prostate of the man, as long as it is covered by the annular trajectory of the massage portion 11, can be stimulated by the massage portion 11 and the massage end 13. During use of the sexual stimulation device 100, the massage portion 11 and the massage end 13 simultaneously act on two different parts of the human body, further improving the stimulation effect.

In this embodiment, the driving mechanism 20 includes a driving module 22, a first driving rod 24 and a second driving rod 37. The driving module 22 is connected to the first driving rod 24 and the second driving rod 37 respectively to drive the first driving rod 24 to rotate around the first axis X1 and drive the second driving rod 37 to rotate around the second axis X2. The first driving rod 24 includes a first end 24*a* and a second end 24*b* opposite to the first end 24*a*. The first end 24*a* is connected to the driving module 22, and the second end 24*b* is connected to the massage portion 11. The second driving rod 37 includes a third end 37*a* and a fourth end 37*b* opposite to the third end 37*a*. The third end 37*a* is connected to the driving module 22, and the fourth end 37*b* is connected to the massage end 13. Under the action of driving module 22, the massage portion 11 rotates along with the second end 24*b* around the first end 24*a*, forming an annular trajectory, which can generate a kneading effect on the human body, and the massage end 13 rotates along with the fourth end 37*b* around the third end 37*a*, forming an annular trajectory, which can generate a kneading effect on the human body. Specifically, the first end 24*a* is connected to the second gear 224, and the third end 37*a* is connected to the third gear 225. In the specifically embodiment, the first axis X1 is perpendicular to the second axis X2. It should be understood that in another embodiment, the first axis X1 may be inclined relative to the second axis X2.

In this embodiment, a second driving wheel 38 is mounted around the fourth end 37*b* of the second driving rod 37. Generally, the second driving wheel 38 is a flat and annular, and has a radial size larger than that of the second driving rod 37, so that it can better drive the massage end 13 to rotate. The massage end 13 forms a connecting block 132 connected to the second driving wheel 38. The connecting block 132 rotates when second driving rod 37 rotates around the second axis X2. The connecting block 132 defines a receiving slot to receive the second driving wheel 38, and the connecting block 132 and the second driving wheel 38 engage with each other with spherical surface. Specifically, the connecting block 132 may be formed on the inner layer 10*b* of the shell 10. Preferably, the second driving wheel 38 has a second neck 39, and the second driving wheel 38 has the smallest inner diameter at the second neck 39. The fourth end 37*b* of the second driving rod 37 extends through the second neck 39 and forms two second protrusions 40 at two opposite axial sides of the second neck 39, respectively. The outer diameter of the second protrusion 40 is larger than the inner diameter of the second neck 39. After assembly, the second protrusions 40 act as position limit components for the second neck 39, so that the second driving wheel 38 will not disengages from the second driving rod 37 without external force. Of course, the second driving wheel 38 and the second driving rod 37 may also be fixed by other means, such as tight fitting, which is not limited in this application.

In this embodiment, a third angle $\alpha 2$ defined between the fourth end 37*b* and the third end 37*a*. The third end 37*a* of the second driving rod 37 extends along the second axis X2, and the fourth end 37*b* extends along a second central axis X4. A fourth angle $\beta 2$ is defined between the second central axis X4 and the second axis X2. Preferably, the fourth angle $\beta 2$ is an obtuse angle, and more preferably, the fourth angle $\beta 2$ is less than 45°. The third angle $\alpha 2$ between the third end 37*a* and the fourth end 37*b* is complementary with the fourth angle $\beta 2$ between the second axis X2 and the second central axis X4. That is, a sum of the third angle $\alpha 2$ and the fourth angle $\beta 2$ is 180°, i.e., $\alpha 2+\beta 2=180°$. In this way, the fourth angle $\beta 2$ between the second central axis X4 and the second axis X2 can be determined according to the third angle $\alpha 1$ between the third end 37*a* and the fourth end 37*b* of the second driving rod 37, thereby determining a rotation radius of the massage end 13. In this embodiment, the massage end 13 is generally coaxial with the fourth end 37*b* of the second driving rod 37, and the second central axis X4 is coaxial with a central axis of the massage end 13.

FIGS. 21-24 show a sixth embodiment of the sexual stimulation device of the present application, which differs from the fifth embodiment mainly in the massage end 13 and the holding end. In this embodiment, part of the holding end bends towards one side of the sexual stimulation device to form a handle 15, thus defining a "L" shaped sexual stimulation device. The bent handle 15 facilitates to hold by the user. A fourth vibrating component 44, such as a vibration motor, is provided inside the handle 15. In this embodiment, the massage end 13 is rotatable around a third axis X5 within a certain range such that the massage 13 is swingable around the third axis X5. In this embodiment, the shell 10 is provided with a massage portion 11 and a massage end 13, and the driving mechanism 20 is connected to the massage portion 11 and the massage end 13 respectively in a transmission way. Under the action of the driving mechanism 20, the massage portion 11 rotates around a first axis X1 to form an annular trajectory, and the massage end 13 rotates around the third axis X5 to form an arc-shaped trajectory. A sensitive area of the human body, such as the clitoris, the vagina of the woman, the rectum, the prostate of the man, as long as it is covered by the annular trajectory of the massage portion 11, can be stimulated by the massage portion 11. A sensitive area of the human body, such as the vagina of the woman, the rectum, as long as it is covered by the arc-shaped trajectory of the massage end 13, can be stimulated by the massage end 13. During use of the sexual stimulation device 100, the massage portion 11 and the massage end 13 simultaneously act on two different parts of the human body, further improving the stimulation effect. It should be understood that the holding end may further form a support opposite to the handle 15, thus defining a "T" shaped sexual stimulation device.

In this embodiment, the driving mechanism 20 includes a driving module 22, a first driving rod 24 and a swing member 53. The driving module 22 is connected to the first driving rod 24 and the swing member 53 respectively to drive the first driving rod 24 to rotate around the first axis X1 and drive the swing member 53 to swing around the third axis X5. The first driving rod 24 includes a first end 24*a* and a second end 24*b* opposite to the first end 24*a*. The first end 24*a* is connected to the driving module 22, and the second end 24*b* is connected to the massage portion 11. The swing member 53 is connected to the massage end 13. Under the action of driving module 22, the massage portion 11 rotates along with the second end 24*b* around the first end 24*a*, forming an annular trajectory, which can generate a kneading effect on the human body, and the massage end 13 swings along with the swing member 53, forming an arc-shaped trajectory, which can generate a kneading effect on the human body. In the specifically embodiment, the third axis X5 is perpendicular to a plane defined by the second axis X2 and the first axis X1. It should be understood that in another embodiment, the third axis X5 may be inclined relative to the plane defined the first axis X1 and the second axis X2.

Specifically, the driving mechanism 20 further includes a third driving rod 54 and an eccentric wheel 55, the third driving rod 54 is connected to the driving module 22, the third driving rod 54 is rotatable around the second axis X2, and the eccentric wheel 55 is connected to the third driving rod 54 to rotate around the second axis X2 along with third driving rod 54. The eccentric wheel 55 includes an eccentric block 551 deviating the second axis X2. The swing member 53 includes two forked blocks 531 away from each other, thus forming an opening slot 533. The eccentric block 551 is movably received in the opening slot 533. A width of the eccentric block 551 is smaller than a width of the opening slot 533, so that the eccentric block 551 can only selectively touch one of the two forked blocks 531. A distance D1 of the eccentric block 551 deviating from the second axis X2 is larger than a difference value D2, so that the eccentric block 551 can push the swing member 53 to swing around the third axis X5 when the eccentric block 551 rotates. Wherein the difference value D2 is a value of the width of the eccentric block 551 minus the width of the opening slot 533. The swing member 53 is rotatably engaged with a rotation shaft 57 arranged along the third axis X5, thus that the swing member 53 is rotatable around the third axis X5. Specifically, the third driving rod 54 is connected the third gear 225.

Specifically, the swing member 53 further includes a first fixing block 535, and the second portion 106 of the inner layer **10*b* forms a second fixing block 1063 on an inner sidewall thereof. The first fixing block 535 is connected to the second fixing block 1063 to connecting the swing member 53 with the massage end 13**.

FIGS. 25-29 show a seventh embodiment of the sexual stimulation device of the present application, which differs from the fourth embodiment mainly in the driving mechanism 20. In this embodiment, the base portion 52 is disposed between the massage end 13 and the holding end, and the massage portion 11 is connected to the base portion 52. The driving mechanism 20 is connected to the massage portion 11 in a transmission way, and connected to an end of the base portion 52 that connected to the holding end in a transmission way. Under the action of the driving mechanism 20, the massage portion 11 rotates around a first axis X1 to form an annular trajectory, and the massage portion 11 and massage end 13 move back and forth along a second axis X2 to form a reciprocating trajectory. In a specifical embodiment, the first portion 105 is corresponding to the holding end, and the second portion 106 is corresponding to the base portion 52 and the massage end 13.

In this embodiment, the driving mechanism 20 includes a driving module 22, a first driving rod 24 and a sliding member 36. The driving module 22 is connected to the first driving rod 24 and the sliding member 36 respectively in a transmission way to drive the first driving rod 24 rotating along the first axis X1 and drive the sliding member 36 moving along the second axis X2. The first driving rod 24 includes a first end **24*a* and a second end 24*b*, and the second end 24*b* is inclined relative to the first end 24*a*. The first end 24*a* is connected to the driving module 22, and the second end 24*b* is inserted into and connected to the massage portion 11. The sliding member 36 is connected to an end of the base portion 52 that connected to the holding end. Under the action of the driving mechanism 20, the massage portion 11 rotates around a first axis X1 to form an annular trajectory, and the massage portion 11 and the massage end 13 move back and forth along the second axis X2 along with the sliding member 36 to form a reciprocating trajectory. In this embodiment, the sliding member 36 is enabled to push the massage portion 11, the passage end 13 and the base portion 52 as a whole to move back and forth for the sliding member 36 is connected to the end of the base portion 52** that connected to the holding end.

Specifically, the driving module 22 includes a motor module 221, a first gear 223 and a second gear 224. The first gear 223 is connected to an output shaft 2211 of the motor module 221, the second gear 224 and the first gear 223 mesh with each other, and the first end **24*a* of the first driving rod 24 is connected to the second gear 224. The motor module 221 runs to drive the first gear 223 and the second gear 224 to rotate, and further drives the first driving rod 24 to rotate, thus driving the massage portion 11 to rotate around the first axis X1. In a specific embodiment, the first gear 223 and the second gear 224 are bevel gears, so that a rotation axis of the first driving rod 24 and a rotation axis of the output shaft 2211 of the motor module 221 intersect (the rotation axes perpendicularly intersect in the embodiment shown in FIG. 2), thus facilitating to arrange the driving module 22 to minimize the sexual stimulation device 100. It should be understood that the first gear 223 and the second gear 224 may be replaced by other transmitting mechanisms such as cylindrical gears, worm and worm wheel. Besides, a transmitting member (such as one or more gear) may be disposed between the first gear 223 connected to the output shaft 2211 and the second gear 224 connected to the first driving rod 24**.

Specifically, the driving module 22 further includes a screwed portion 230 and a pin 228, the screwed portion 230 is connected the output shaft 2211 and the pin 228 is fixedly connected to the sliding member 36. The pin 228 movably engages in a screwed slot 2271 defined in the screwed portion 230, thus forming a screw-nut mechanism. The motor module 221 runs to drive the screwed portion 230 to rotate, thus driving the pin 228 and the sliding member 36 to linearly move relative to the screwed portion 230. It should be understood that the screw-nut mechanism may also be replaced by other transmitting mechanisms such as a rack steering mechanism that transmitting a rotation to linear movement.

In this embodiment, the sliding member 36 is fixed relative to the second portion 106. Specifically, the driving module 22 further includes a rail 229 fixed relative to the first portion 105, and the rail 229 is received in the sliding member 36. The rail 229 defines a sliding slot 2291 along the second axis X2, and the sliding member 36 forms a block 361 on an inner sidewall thereof. The block 361 is movably engaged in the sliding slot 2291 of the rail 229 to allow the sliding member 36 sliding in the sliding slot 2291. It should be understood that the block 361 may be formed on the rail 229, and the sliding slot 2291 may be defined on sliding member 36. Specifically, the rail 229 is fixedly connected to the second portion 106.

Specifically, the sliding member 36 defines a pinhole 362 and forms a latching block 364 engaged in a slot defined in the second portion 106. The pin 228 includes an engaging portion 2281 and a pin portion 2283. The engaging portion 2281 is arc-shaped so as to perfectly engage with the helical screwed slot 2271. The pin portion 2283 is inserted into the pinhole 362 of the sliding member 36, so that the sliding member 36 and the second portion 106 move along the second axis X2 when the pin 228 moves. Specifically, the sliding member 36 has two parts separately manufactured, that is, an inserting block 366 and a main portion of the sliding member 36 are manufactured separately. During assembling, the engaging portion 2281 is inserted into the screwed slot 2271 of the screwed portion 230, and then the screwed portion 230 extends into the rail 229 and the rail 229 is inserted into the sliding member 36. The inserting block 366 is connected to the main portion of the sliding member 36 finally.

Figure 26:
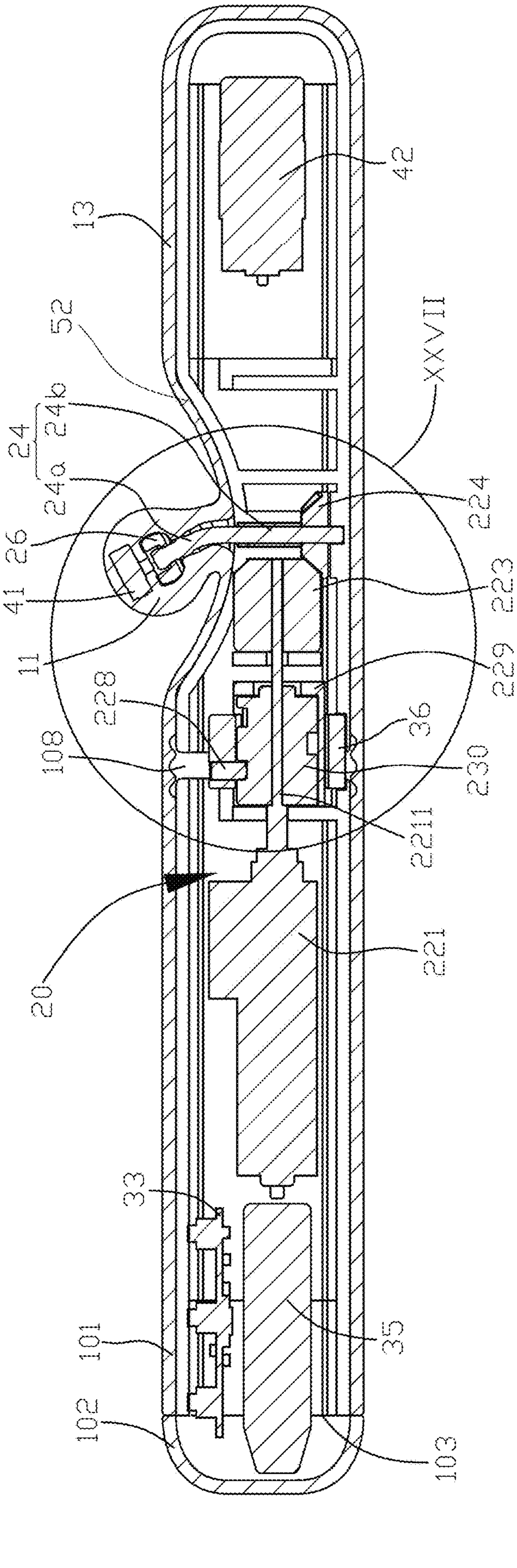
FIG. 26 is a cross sectional view of the sexual stimulation device of FIG. 25 showing a retracted state.
Figure 27:
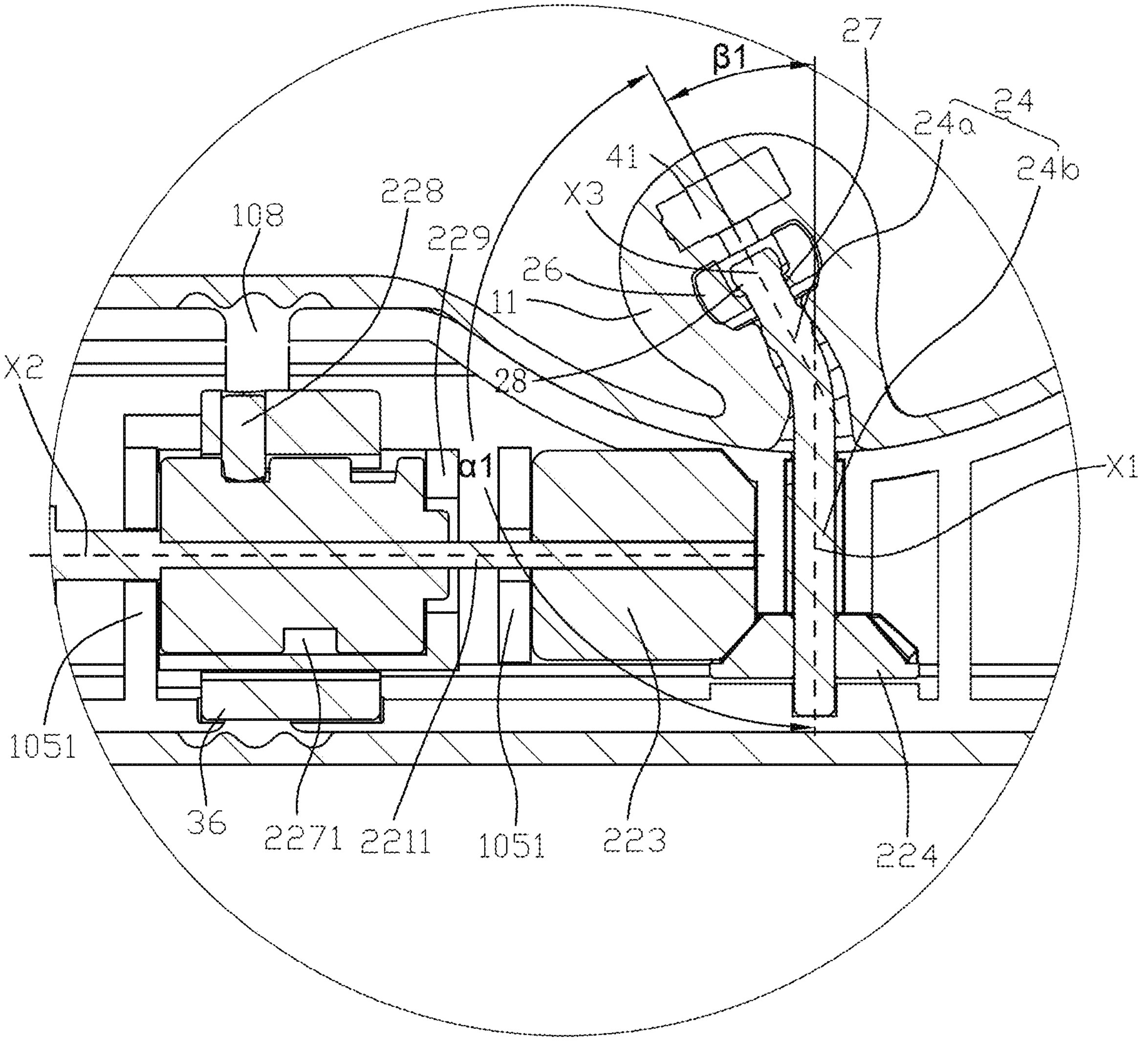
FIG. 27 is an enlarged view of circle XXVII of FIG. 26.
Figure 28:
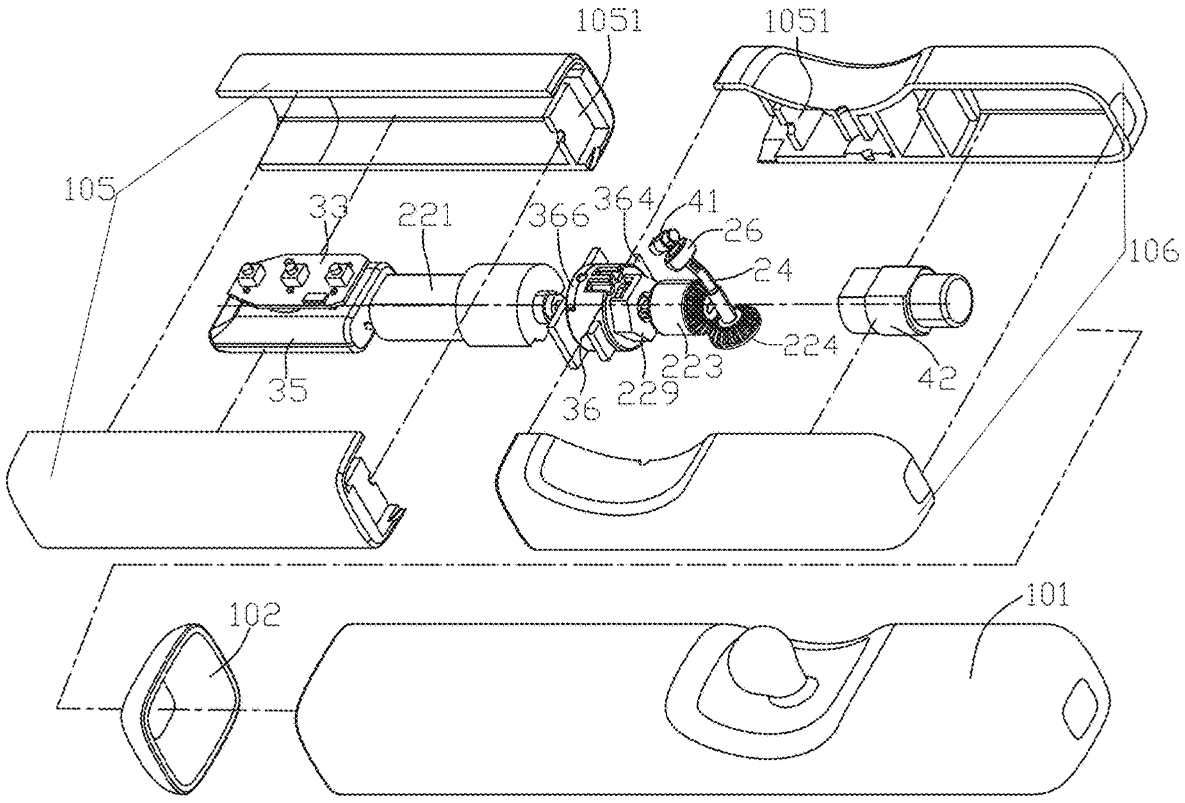
FIG. 28 is a schematic, exploded view of the sexual stimulation device of FIG. 25.
Figure 29:
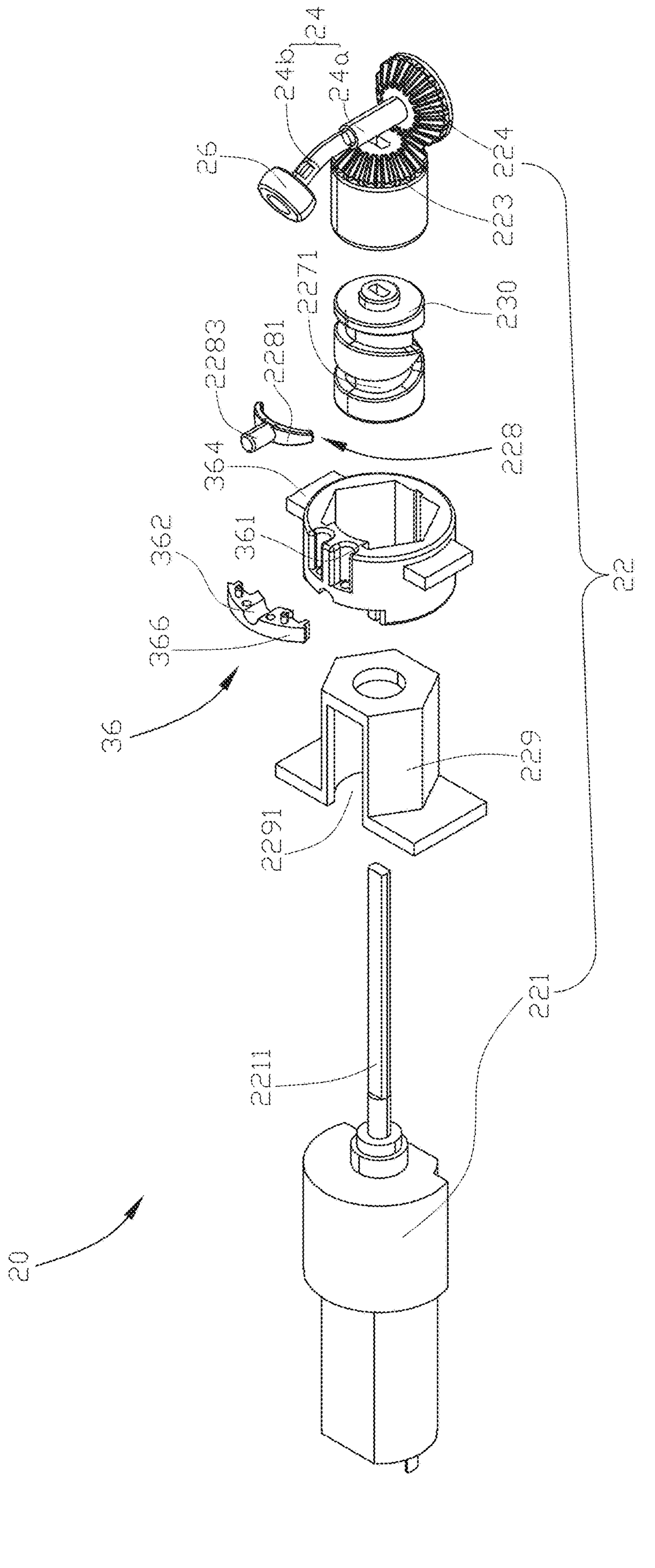
FIG. 29 is a further exploded view of the driving mechanism of the sexual stimulation device of FIG. 25.
Figure 30:
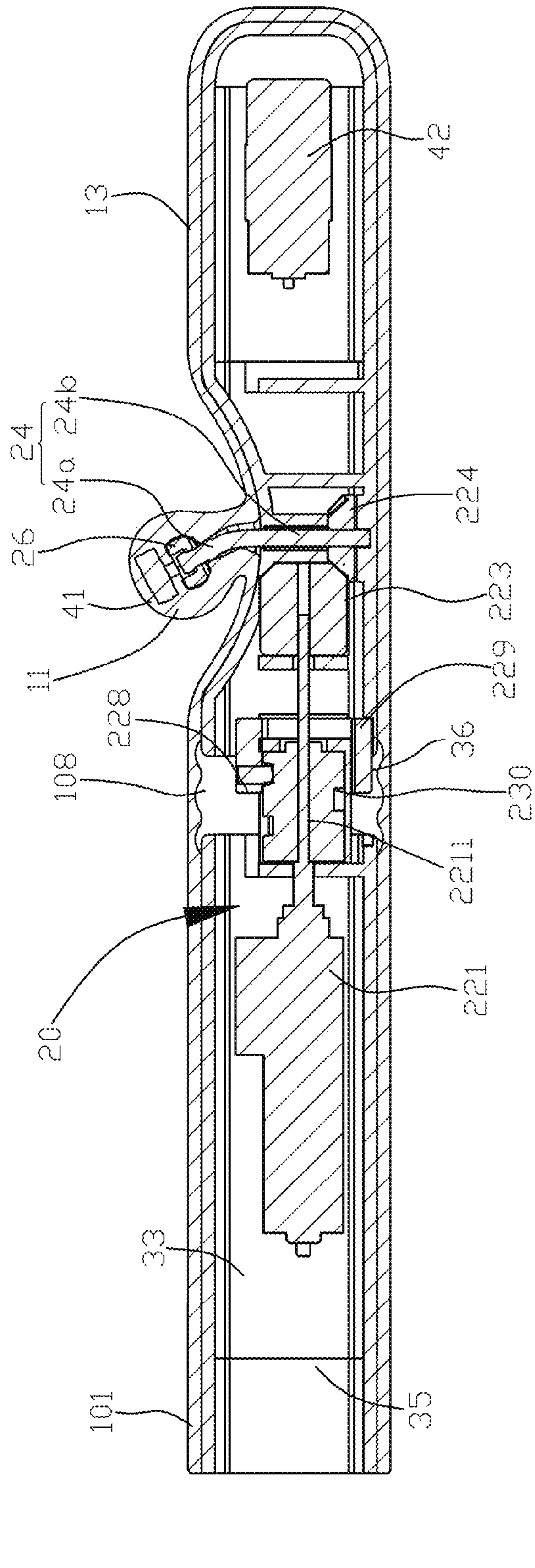
FIG. 30 is a cross sectional view of the sexual stimulation device of FIG. 26 showing an elongated state.
Figure 31:
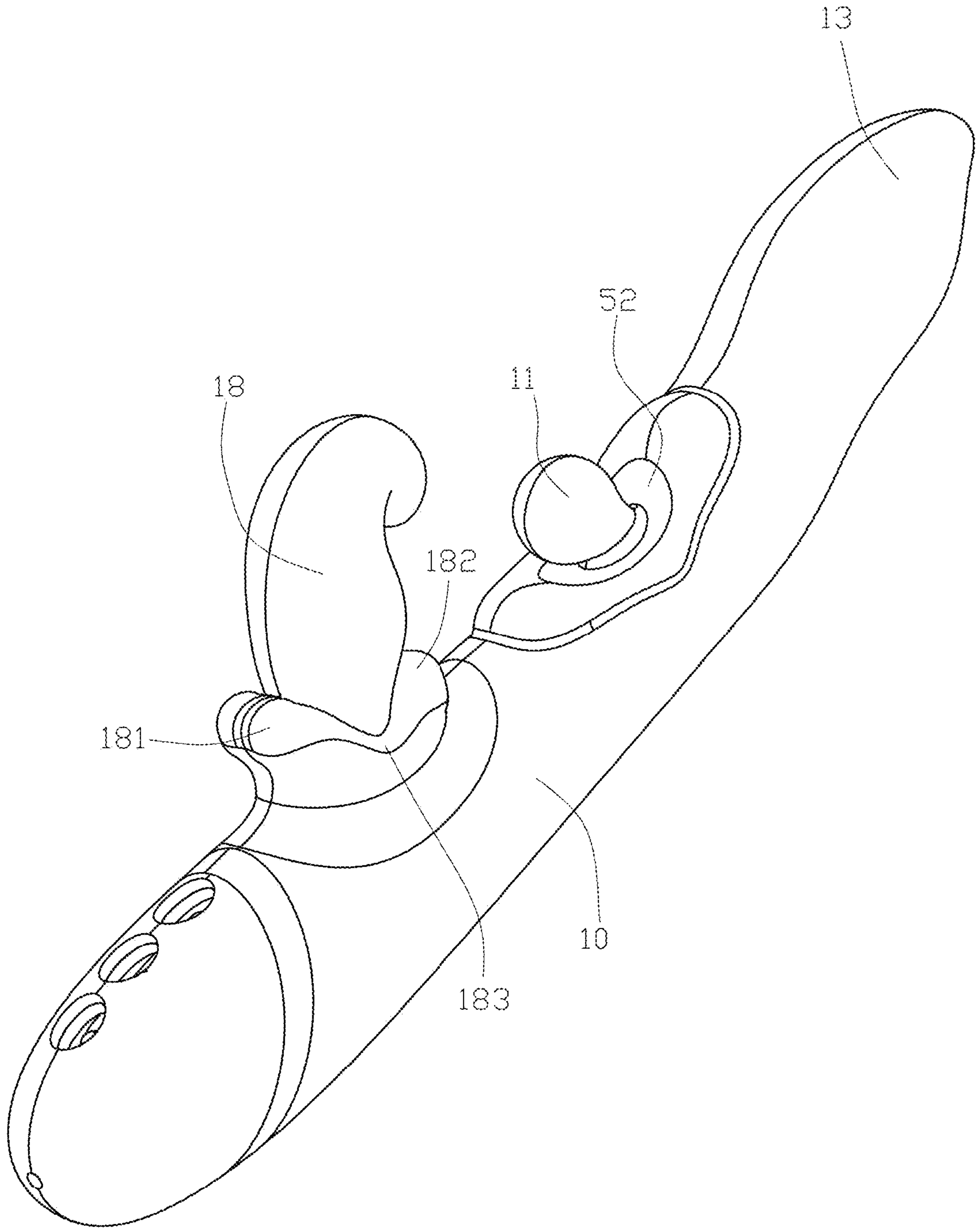
FIG. 31 is a schematic, assembled view of a sexual stimulation device according to an eighth embodiment of the present application.
Figure 32:
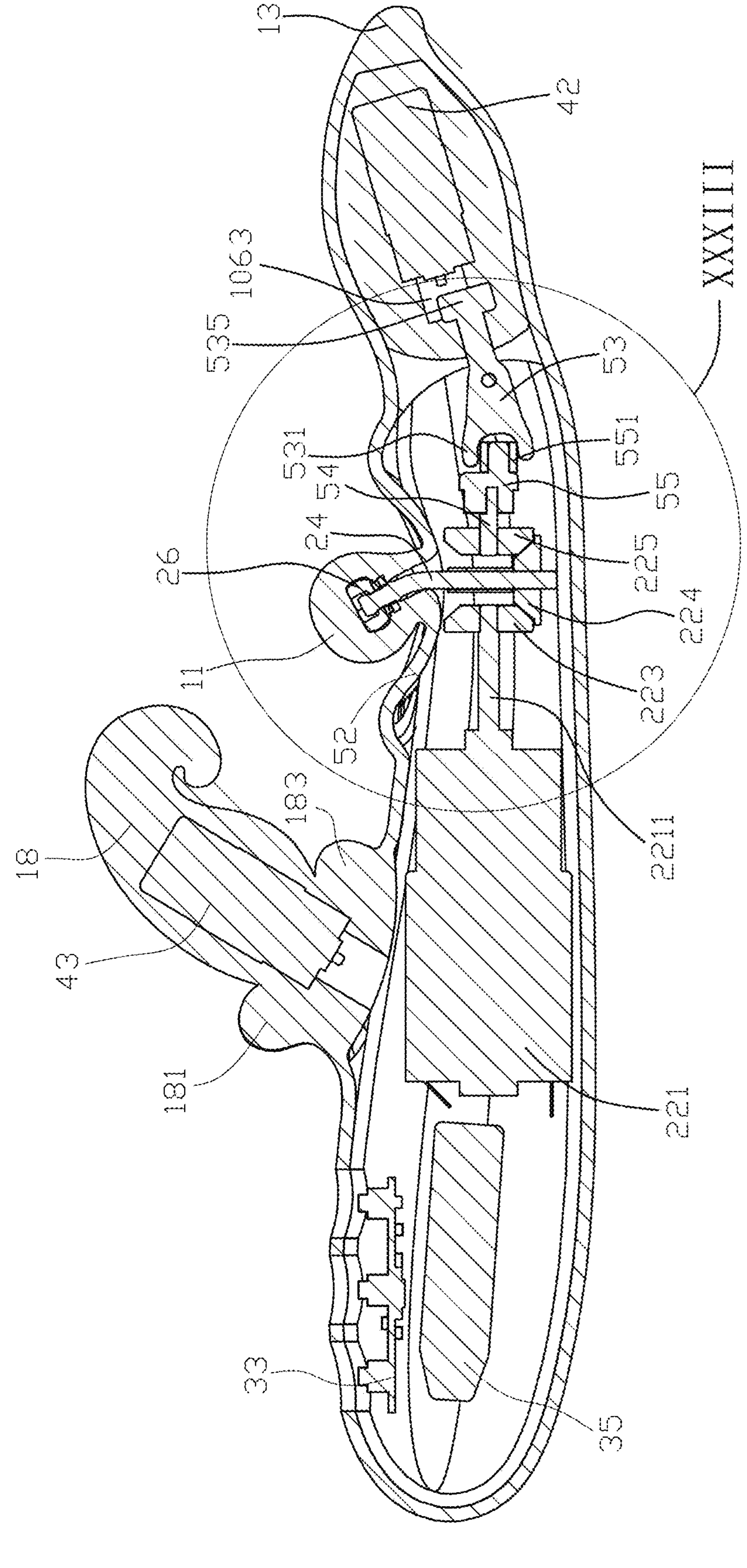
FIG. 32 is a cross sectional view of the sexual stimulation device of FIG. 31.
Figure 33:
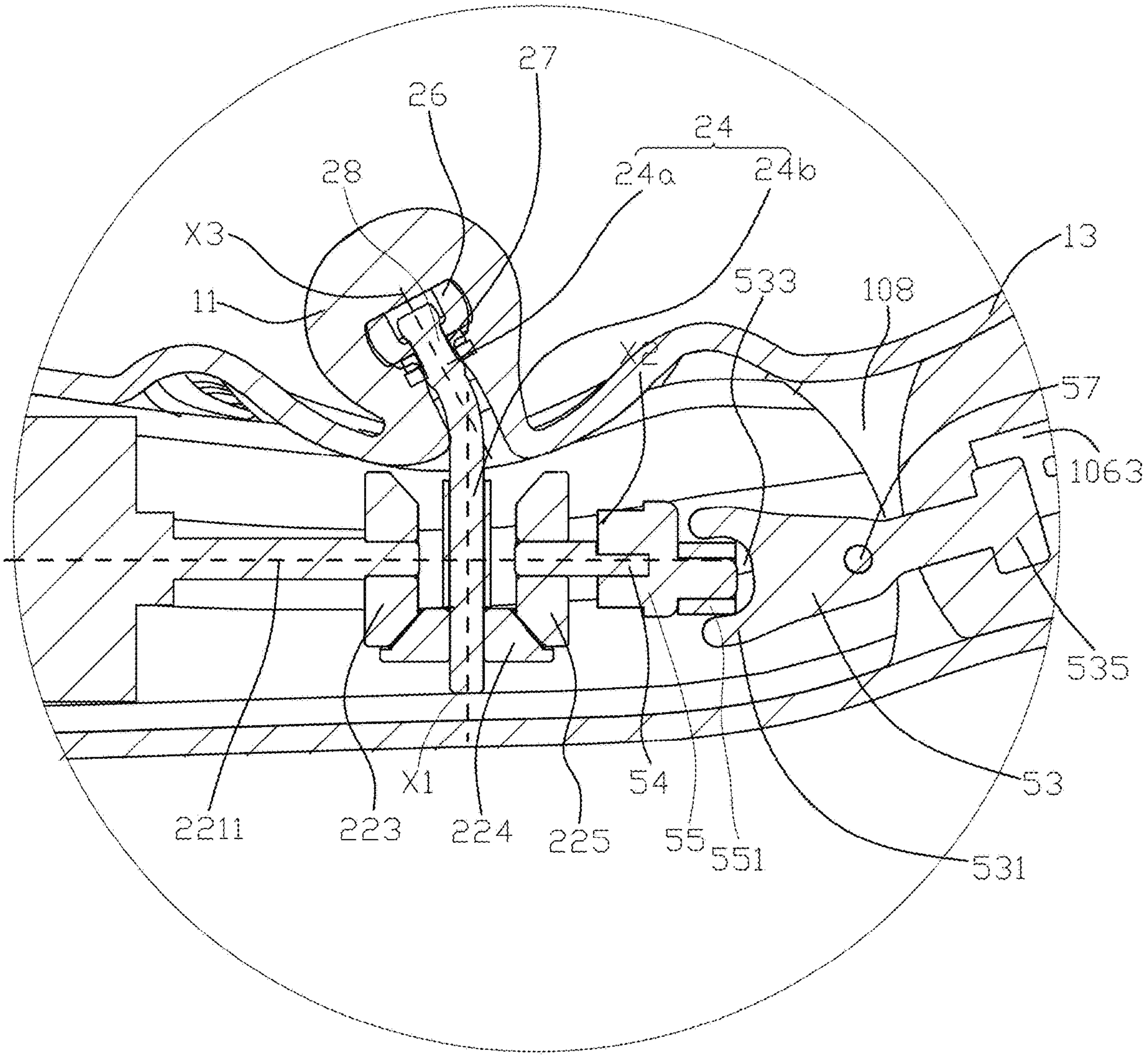
FIG. 33 is an enlarged view of circle XXXIII of FIG. 32.
Figure 34:
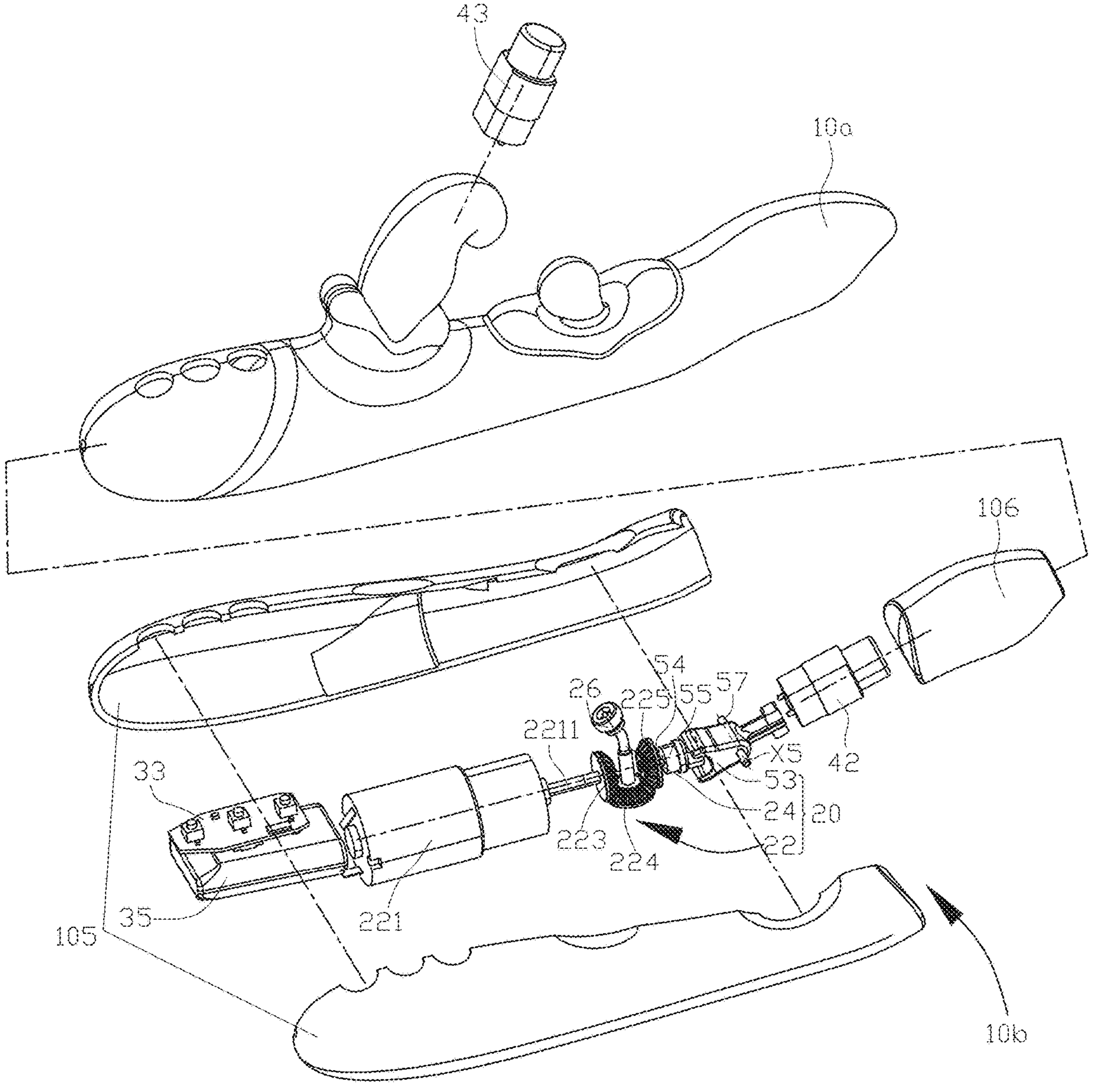
FIG. 34 is a schematic, exploded view of the sexual stimulation device of FIG. 31.

Referring to FIG. 26, when the sexual stimulation device 100 is in a retracted state, the massage portion 11 and the massage end 13 move towards the holding end, and the gap 108 has a first width. Referring to FIG. 30, when the sexual stimulation device 100 is in an elongated state, the massage portion 11 and the massage end 13 move away from the holding end, and the gap 108 has a second width larger than the first width.

FIGS. 31-34 show an eighth embodiment of the sexual stimulation device of the present application, which differs from the sixth embodiment mainly in the shell 10. In this embodiment, the shell 10 is elongated and generally rod-shaped, being similar to the male penis, and a handle 15 in the sixth embodiment is omitted. The shell 10 of the eighth embodiment of the sexual stimulation device is similar to the shell 10 of the third embodiment of the sexual stimulation device 100. That is, in this embodiment, the shell 10 includes a massage portion 11, a massage end 13 formed on a front end of the shell 10 and a branch 18 extending from the middle portion of the shell 10 curvedly towards an upper side of a front end of the shell 10. A base portion 52 is formed between the branch 18 and massage end 13, and the massage portion 11 is connected to the base portion 52. Specifically, the shell 10 further forms a first engaging portion 181 and a second engaging portion 182, and two ends of the first engaging portion 181 are respectively connected to two ends of the second engaging portion 182 to form two connection portions 183. The first engaging portion 181 and the second engaging portion 182 cooperatively form a mouth-shaped portion. An end of the branch 18 is connected to the first engaging portion 181 and the second engaging portion 182 and disposed between the first engaging portion 181 and the second engaging portion 182.

In this embodiment, a driving mechanism 20 is the same as the driving mechanism 20 of the sexual stimulation device in the sixth embodiment. That is, the driving mechanism 20 includes a driving module 22, a first driving rod 24 and a swing member 53. The driving module 22 is connected to the first driving rod 24 and the swing member 53 respectively to drive the first driving rod 24 to rotate around a first axis X1 and drive the swing member 53 to swing around a third axis X5. The first driving rod 24 includes a first end 24*a* and a second end 24*b* opposite to the first end 24*a*. The first end 24*a* is connected to the driving module 22, and the second end 24*b* is connected to the massage portion 11. The swing member 53 is connected to the massage end 13. Under the action of driving module 22, the massage portion 11 rotates along with the second end 24*b* around the first end 24*a*, forming an annular trajectory, which can generate a kneading effect on the human body, and the massage end 13 swings along with the swing member 53, forming an arc-shaped trajectory, which can generate a kneading effect on the human body. In the specifically embodiment, the third axis X5 is perpendicular to a plane defined by the second axis X2 and the first axis X1. It should be understood that in another embodiment, the third axis X5 may be inclined relative to the plane defined the first axis X1 and the second axis X2. Specifically, the driving mechanism 20 further includes a third driving rod 54 and an eccentric wheel 55, the third driving rod 54 is connected to the driving module 22, the third driving rod 54 is rotatable around the second axis X2, and the eccentric wheel 55 is connected to the third driving rod 54 to rotate around the second axis X2 along with third driving rod 54. The eccentric wheel 55 includes an eccentric block 551 deviating the second axis X2. The swing member 53 includes two forked blocks 531 away from each other, thus forming an opening slot 533. The eccentric block 551 is movably received in the opening slot 533. A width of the eccentric block 551 is smaller than a width of the opening slot 533, so that the eccentric block 551 can only selectively touch one of the two forked blocks 531. A distance D1 of the eccentric block 551 deviating from the second axis X2 is larger than a difference value D2, so that the eccentric block 551 can push the swing member 53 to swing around the third axis X5 when the eccentric block 551 rotates. Wherein the difference value D2 is a value of the width of the eccentric block 551 minus the width of the opening slot 533. The swing member 53 is rotatably engaged with a rotation shaft 57 arranged along the third axis X5, thus that the swing member 53 is rotatable around the third axis X5. Specifically, the third driving rod 54 is connected the third gear 225. Specifically, the swing member 53 further includes a first fixing block 535, and the second portion 106 of the inner layer 10*b* forms a second fixing block 1063 on an inner sidewall thereof. The first fixing block 535 is connected to the second fixing block 1063 to connecting the swing member 53 with the massage end 13.

Finally, it should be noted that: the above merely describes preferred embodiments of the present application without intention to limit the scope of the present application. Although the present application has been described in detail with reference to the foregoing embodiments, for those skilled in the art, the technical solutions described in the foregoing embodiments can still be modified, or some of the technical features can be equally replaced. Any modifications, equivalent replacements, improvements, and etc. made within the spirit and principle of the present application should be within the scope of the present application.

What is claimed is:

1. A sexual stimulation device, comprising:

a shell comprising a massage portion and a massage end, each of the massage portion and the massage end comprising flexible material; and a driving mechanism provided in the shell, wherein the driving mechanism is connected to the massage portion in a transmission way to drive the massage portion to rotate, and the driving mechanism is further connected to the massage end in a transmission way to drive the massage end to swing.

2. The sexual stimulation device of claim 1, wherein the shell is elongated and generally rod-shaped, the shell further comprises a holding end, the massage end is defined on a front end of the shell, the holding end is defined on a rear end of the shell, the massage portion is disposed between the holding end and the massage end; a vibration component is provided in one of the massage portion and the massage end, or a vibration component is provided in each of the massage portion and the massage end.

3. The sexual stimulation device of claim 2, wherein a middle portion of the shell forms a base portion, the massage portion is connected to the base portion, the base portion is concaved inwardly to form a recess, wherein the recess forms a bowl-shaped portion on the shell, the massage portion extends partly beyond the base portion through an open side of the base portion.

4. The sexual stimulation device of claim 1, wherein the shell further comprises a holding end, the massage end is defined on a front end of the shell, the holding end is defined on a rear end of the shell, the massage portion is disposed between the holding end and the passage end, a branch extends from a middle portion of the shell curvedly towards an upper side of a front end of the shell, and the massage portion is disposed between the branch and the massage end, and a vibration component is provide in at least one of: the massage portion, the massage end or the branch.

5. The sexual stimulation device of claim 1, wherein the driving mechanism comprises a driving module and a first driving rod, the first driving rod comprises a first end extending along a first axis and a second end opposite to the first end, the second end is inclined relative to the first end, the first end is connected to the driving module in a transmission way, and the second end is inserted into the massage portion of the shell.

6. The sexual stimulation device of claim 5, wherein the driving mechanism further comprises a swing member, the driving module is connected to the swing member in a transmission way to drive the swing member to swing around a second axis, and the swing member is connected to the massage end.

7. The sexual stimulation device of claim 6, wherein the driving mechanism further comprises a second driving rod and an eccentric wheel, the second driving rod is connected to the driving module, the second driving rod is rotatable around a third axis, the eccentric wheel is connected to the second driving rod to rotate around the third axis along with the second driving rod; the eccentric wheel comprises an eccentric block deviating the third axis, the swing member comprises two forked blocks spaced apart from each other, thus forming an opening slot, and the eccentric block is movably received in the opening slot.

8. The sexual stimulation device of claim 7, wherein the driving module comprises a motor module, a first gear, a second gear and third gear, the first gear is connected to an output shaft of the motor module, the second gear and the first gear mesh with each other, the first end of the first driving rod is connected to the second gear, the third gear meshes with the second gear, the second driving rod is connected to the third gear, the first gear, the second gear and the third gear are bevel gears, the third axis is perpendicular to the first axis, and the second axis is perpendicular to a plane defined by the first axis and the third axis.

9. The sexual stimulation device of claim 1, wherein a middle portion of the shell forms a base portion, the massage portion is connected to the base portion; the shell is a double-layer structure, and comprises an outer layer and an inner layer inside the outer layer, the inner layer of the shell comprises a first portion and a second portion, the first portion and the second portion depart from each other thus defining a gap between the first portion and the second portion, and the second portion is movable relative to the first portion;

wherein the first portion is corresponding to a holding end and the base portion, and the second portion is corresponding to the massage end; or the first portion is corresponding to the holding end, and the second portion is corresponding to the base portion and the massage end.

10. A sexual stimulation device, comprising:

a shell comprising a massage portion and a massage end, each of the massage portion and the massage end comprising flexible material; and a driving mechanism provided in the shell, wherein the driving mechanism is connected to the massage portion in a transmission way to drive the massage portion to rotate, and the driving mechanism is further connected to the massage end in a transmission way to drive the massage end to move.

* * * * *